US 9,131,568 B2

(12) United States Patent
Kunimatsu

(10) Patent No.: US 9,131,568 B2
(45) Date of Patent: Sep. 8, 2015

(54) LIGHT-EMITTING DIODE DRIVING APPARATUS AND SEMICONDUCTOR DEVICE

(71) Applicant: Panasonic Intellectual Property Management Co., Ltd., Osaka (JP)

(72) Inventor: Takashi Kunimatsu, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/537,596

(22) Filed: Nov. 10, 2014

(65) Prior Publication Data

US 2015/0061524 A1     Mar. 5, 2015

Related U.S. Application Data

(63) Continuation of application No. PCT/JP2013/002697, filed on Apr. 22, 2013.

(30) Foreign Application Priority Data

May 9, 2012   (JP) .................................. 2012-107250

(51) Int. Cl.
*H05B 37/00* (2006.01)
*H05B 33/08* (2006.01)
*H02M 7/46* (2006.01)

(52) U.S. Cl.
CPC ............. *H05B 33/0815* (2013.01); *H02M 7/46* (2013.01); *H05B 33/0851* (2013.01)

(58) Field of Classification Search
None
See application file for complete search history.

(56) References Cited

U.S. PATENT DOCUMENTS

| 7,915,836 | B2 | 3/2011 | Cheng |
| 8,098,503 | B2 | 1/2012 | Gaknoki et al. |
| 8,242,765 | B2 * | 8/2012 | Kunimatsu .................... 323/285 |
| 8,330,380 | B2 | 12/2012 | Fujimura et al. |
| 8,593,067 | B2 | 11/2013 | Iwai et al. |
| 2008/0224625 | A1 * | 9/2008 | Greenfeld ..................... 315/201 |
| 2010/0060190 | A1 | 3/2010 | Cheng |

(Continued)

FOREIGN PATENT DOCUMENTS

| JP | 2000-349376 A | 12/2000 |
| JP | 2004-119078 A | 4/2004 |

(Continued)

OTHER PUBLICATIONS

International Search Report issued in PCT/JP2013/002697, dated May 21, 2013, with English translation.

*Primary Examiner* — Jany Richardson
(74) *Attorney, Agent, or Firm* — McDermott Will & Emery LLP

(57) ABSTRACT

A light-emitting diode driving apparatus including a rectifying circuit, a switching element, a choke coil, an output current sensing circuit, an LED light source, a rectifier diode, a control circuit, and a feedback sensing circuit which is connected to the output current sensing circuit for receiving an output feedback signal output from the output current sensing circuit, wherein the feedback sensing circuit outputs a feedback dummy signal, and outputs to the control circuit a control signal that controls switching of the switching element in response to a signal based on an error between the output feedback signal and the feedback dummy signal.

28 Claims, 17 Drawing Sheets

(56) References Cited

U.S. PATENT DOCUMENTS

| | | |
|---|---|---|
| 2010/0259181 A1 | 10/2010 | Fujimura et al. |
| 2011/0109230 A1* | 5/2011 | Simi ............................ 315/119 |
| 2011/0181198 A1 | 7/2011 | Iwai et al. |
| 2013/0134884 A1* | 5/2013 | Nakajo et al. ................. 315/122 |
| 2013/0181626 A1* | 7/2013 | Chen ........................ 315/200 R |

FOREIGN PATENT DOCUMENTS

| | | |
|---|---|---|
| JP | 2007-318914 A | 12/2007 |
| JP | 2010-062515 A | 3/2010 |
| JP | 2010-245421 A | 10/2010 |
| JP | 2011-130543 A | 6/2011 |
| JP | 2011-154860 A | 8/2011 |

\* cited by examiner

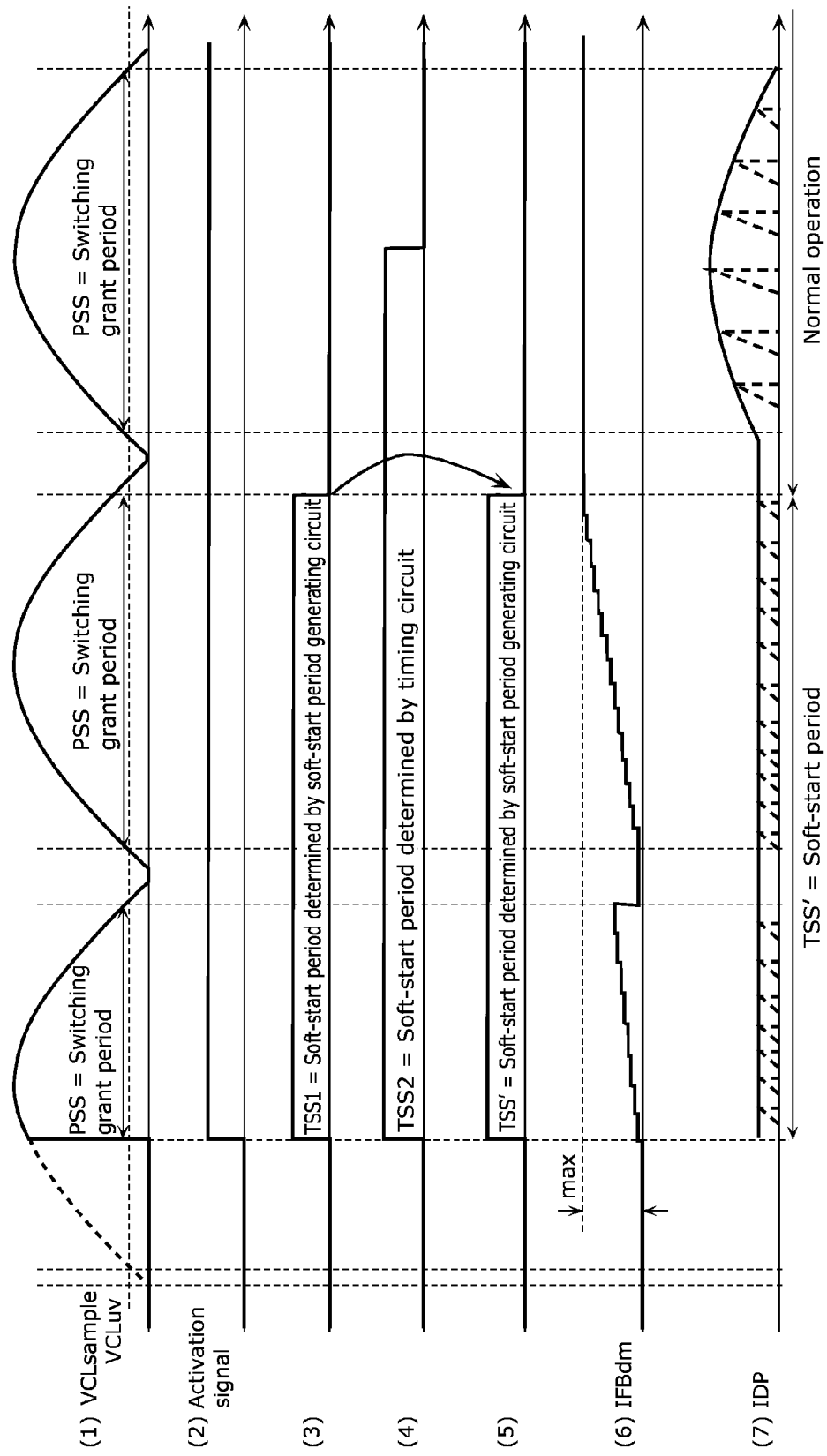

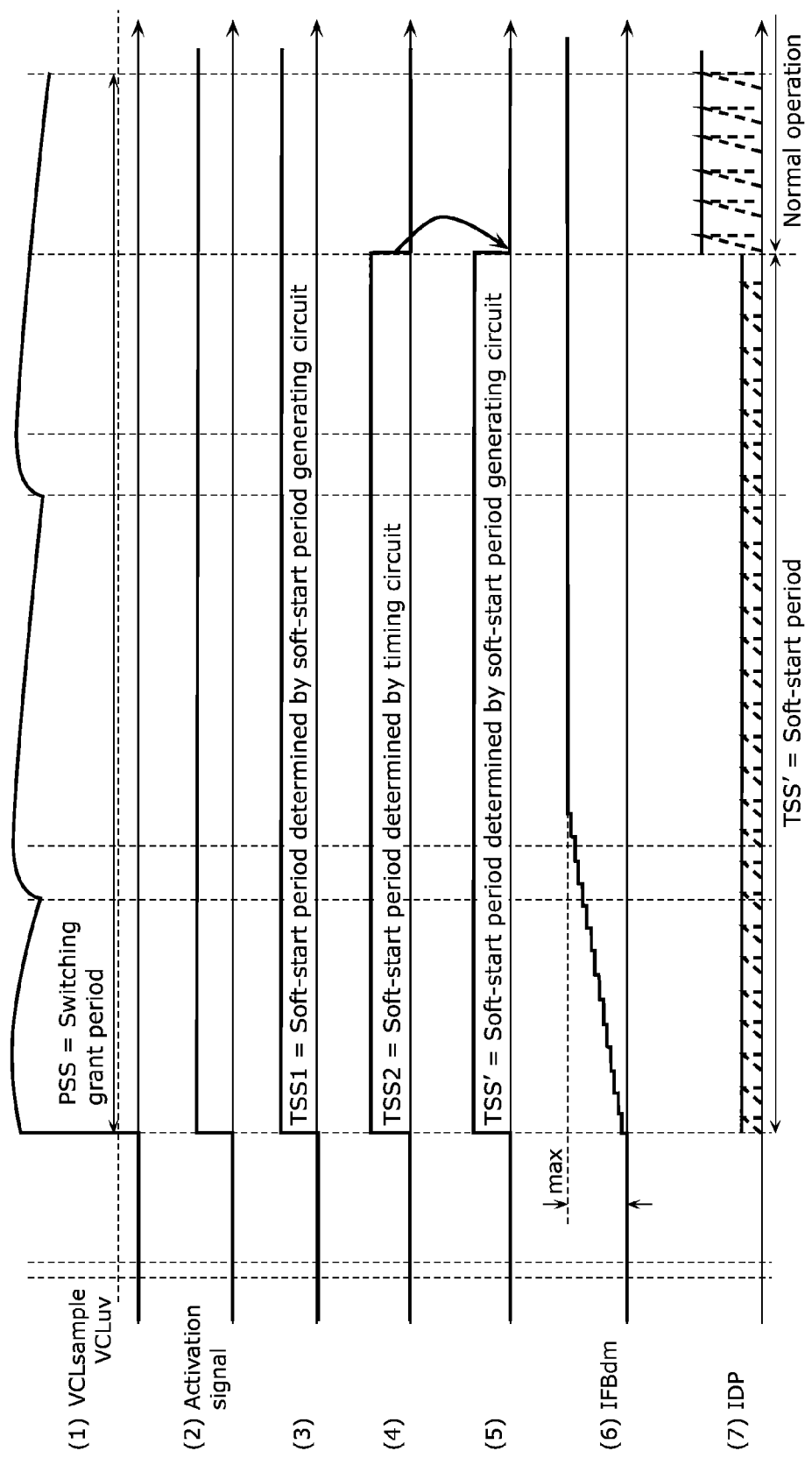

US 9,131,568 B2

LIGHT-EMITTING DIODE DRIVING APPARATUS AND SEMICONDUCTOR DEVICE

CROSS REFERENCE TO RELATED APPLICATIONS

This is a continuation application of PCT International Application No. PCT/JP2013/002697 filed on Apr. 22, 2013, designating the United States of America, which is based on and claims priority of Japanese Patent Application No. 2012-107250 filed on May 9, 2012. The entire disclosures of the above-identified applications, including the specifications, drawings and claims are incorporated herein by reference in their entirety.

FIELD

The present invention relates to a light-emitting diode driving apparatus and a semiconductor device.

BACKGROUND

In recent years, light-emitting diode driving semiconductor devices for driving a light-emitting diode (hereinafter, referred to as an LED) and light-emitting diode driving apparatuses having the same are developed and put in practical use. In particular, a large volume of lighting devices, such as an LED bulb having a white LED as a light source, are manufactured. Moreover, various driver circuits which properly drive an LED are proposed (e.g., see Patent Literatures (PTLs) 1 to 3).

A conventional light-emitting diode driving apparatus disclosed in PTL 1 is an apparatus which has a non-isolated flyback converter circuit structure, and includes a transformer for transforming a DC voltage into energy.

A conventional light-emitting diode driving apparatus disclosed in PTL 2 has a buck converter circuit structure. For example, the light-emitting diode driving apparatus includes a buck converter which includes a switching element Q21, a driver circuit 213, a rectifying element D22, a choke coil L23, and a smoothing condenser C24. Here, the buck converter is, particularly, a high-side buck converter in which a switching element is disposed on the high side of an input voltage.

To construct a non-isolated circuit, the use of a buck converter is advantageous in efficiency or cost, as compared to a flyback converter.

A conventional light-emitting diode driving apparatus disclosed in PTL 3 includes a buck converter as with PTL 2. The buck converter is, particularly, a low-side buck converter in which a switching element is disposed on the low side (reference potential) of an input voltage.

CITATION LIST

Patent Literature

[PTL 1] U.S. Pat. No. 8,098,503
[PTL 2] Japanese Unexamined Patent Application Publication No. 2011-130543
[PTL 3] Japanese Unexamined Patent Application Publication No. 2010-245421

SUMMARY

Technical Problem

In the conventional light-emitting diode driving apparatus disclosed in PTL 1, a voltage VFB proportional to a current through an LED represents a feedback signal. The voltage VFB is a potential difference which is attributed to a current through a sense resistor and relative to reference potentials of a controller and the switching element. Thus, the voltage VFB is always a positive signal relative to the reference potentials of the controller and the switching element. However, if the control circuit structure is maintained, such a problem arises that the conventional light-emitting diode driving apparatus is not applicable to a buck converter that has good energy conversion efficiency.

In the conventional light-emitting diode driving apparatus disclosed in PTL 2, a current through an LED light source is sensed across a current sensing resistor to introduce a feedback signal which is a positive signal relative to a reference voltage of a control circuit. The circuit structure includes, on the high-side of the input voltage, a driver circuit for driving the switching element, to construct a buck converter.

However, the switching element and the control circuit, which provides control over switching of the switching element, have different reference potentials. Thus, to exchange signals over different reference voltages, a dedicated driver circuit is required. This increases the overall cost of the light-emitting diode driving apparatus.

A dedicated boost circuit is also required to implement power factor correction, which is complex to control and increases cost. This causes an increase in the size and cost of the light-emitting diode driving apparatus.

In the conventional light-emitting diode driving apparatus disclosed in PTL 3, the power factor correction is implemented just by the use of a low-side buck converter. However, since a voltage divider circuit obtains a reference voltage proportional to a full-wave rectified voltage to control the switching of a switching element, a peak value of a current through the switching element or an LED light source may become too high when a high input voltage is applied.

In light of the above-described conventional problems, the present invention provides a light-emitting diode driving apparatus and a semiconductor device, which employs a high-side buck converter circuit structure in which a switching element and a control circuit which controls it are disposed on the high side of an input voltage, allows constant current control and power factor correction if an input voltage has a pulsating waveform, and has less chance of an increase in output or of switching element breakage even if the input voltage greatly varies.

Solution to Problem

To achieve the above object, the light-emitting diode driving apparatus according to the present invention is a light-emitting diode driving apparatus including: a rectifying circuit which rectifies an AC voltage input from an AC power source, to output a DC voltage; a switching element having an input terminal connected to a high side of the rectifying circuit, which turns on and off the DC voltage; a choke coil having one end connected to an output terminal of the switching element; an output current sensing circuit connected between the output terminal of the switching element and the one end of the choke coil, for sensing a current through the choke coil; an LED light source which includes one or more light-emitting diodes each having an anode terminal connected to another end of the choke coil and a cathode terminal connected to a low side of the rectifying circuit; a rectifier diode having an anode terminal connected to the low side of the rectifying circuit and a cathode terminal connected to the output terminal of the switching element, the rectifier diode supplying the LED light source with counter electromotive force developed in the choke coil; a control circuit which outputs a drive signal that controls on and off operation of the switching element, based on an operation reference voltage which is a voltage at a same potential as a node between the output terminal of the switching element and the cathode terminal of the rectifier diode; and a feedback sensing circuit connected to the output current sensing circuit, for receiving an output feedback signal output from the output current sensing circuit, wherein the feedback sensing circuit outputs a feedback dummy signal, and outputs to the control circuit a control signal that controls switching of the switching element in response to a signal based on an error between the output feedback signal and the feedback dummy signal.

According to this aspect, operation reference voltages of the switching element and the control circuit, which provides the control over the switching of the switching element, are at a same potential. This obviates the need for a driver circuit for exchanging signals at different operation reference voltages. Additionally, the switching element, the control circuit, and the feedback sensing circuit can be formed on a same semiconductor substrate or incorporated together in a same package. Moreover, the feedback sensing circuit corresponds to a negative signal, and thus a high-side buck converter is implemented, achieving high-efficiency drive and reduced size of the light-emitting diode driving apparatus, and space saving.

Advantageous Effects

The light-emitting diode driving apparatus and the semiconductor device can be implemented which allow constant current control and power factor correction if the input voltage has a pulsating waveform, allows constant current control if the input voltage is smoothed, has less chance of an increase in output or less chance of switching element breakage even if the input voltage greatly varies, and can accommodate the flyback converter circuit structure as well.

BRIEF DESCRIPTION OF DRAWINGS

These and other objects, advantages and features of the invention will become apparent from the following description thereof taken in conjunction with the accompanying drawings that illustrate a specific embodiment of the present invention.

FIG. 14A is a diagram showing waveforms when components included in the light-emitting diode driving apparatus according to the embodiment 5 are in operation.

FIG. 14B is a diagram showing waveforms when the components included in the light-emitting diode driving apparatus according to the embodiment 5 are in operation.

DESCRIPTION OF EMBODIMENTS

Hereinafter, an aspect of the embodiment will be described, with reference to the accompanying drawings. The same reference signs are given in the figures to refer to the same components, and duplicate description is therefore omitted. The embodiments below are merely illustrative, and, arrangement of the components, for example, is not specific to those described below. Various modifications to the present embodiment are intended to be included within the scope of appended claims.

Embodiment 1

Figure 1:
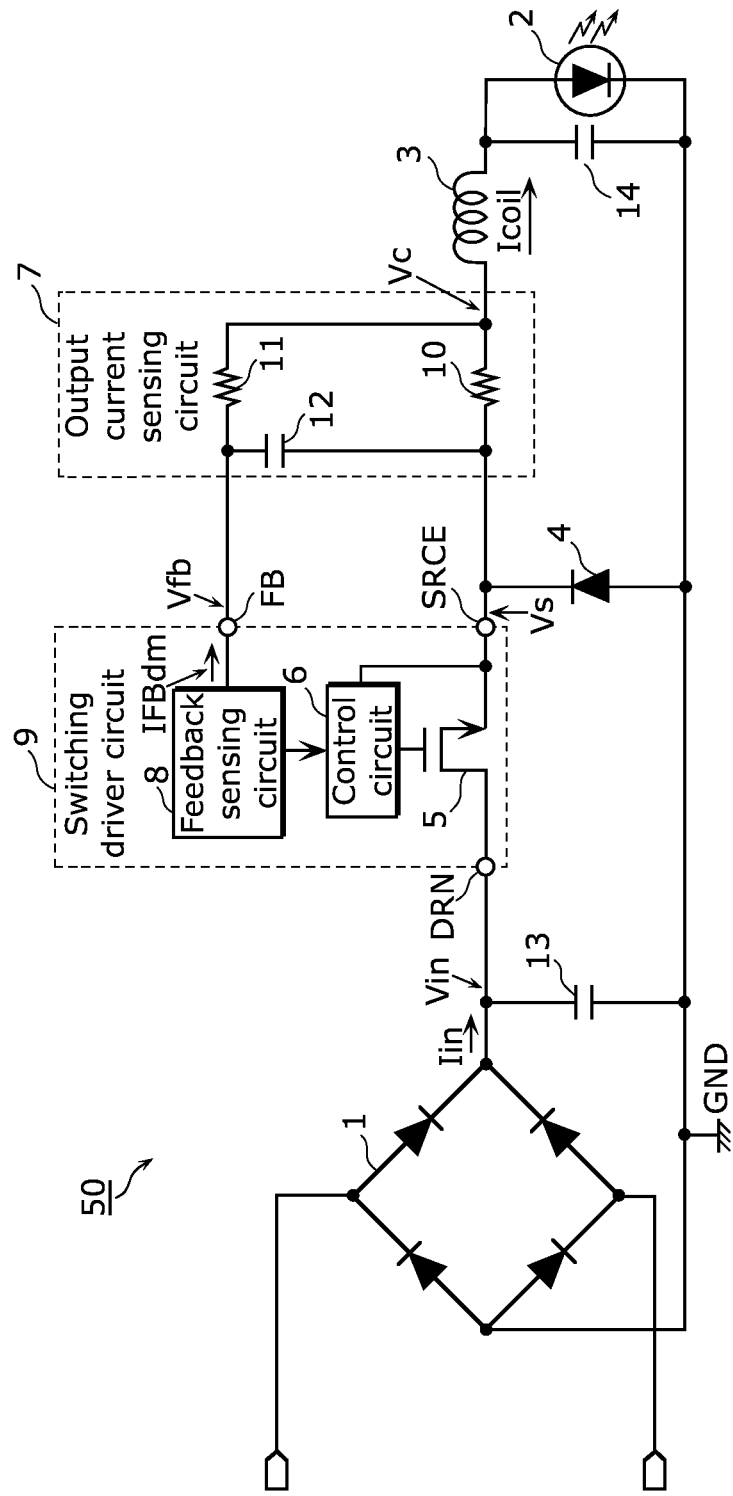
FIG. 1 is a circuit diagram showing examples of a light-emitting diode driving apparatus and a semiconductor device according to an embodiment 1.

FIG. 1 is a circuit diagram showing an example configuration of a light-emitting diode driving apparatus 50 according to an embodiment 1. The light-emitting diode driving apparatus 50 according to the present embodiment is a driving apparatus having a high-side buck converter circuit structure which drives one or more LED light sources.

In FIG. 1, a rectifying circuit 1 is connected to an AC power source (not shown), such as mains supply, and rectifies an AC voltage to generate a pulsating voltage. The rectifying circuit 1 is, for example, a full-wave rectification circuit, and generates a full-wave rectified voltage from an AC voltage. The high side of the rectifying circuit 1 is connected to a high-side terminal DRN of a switching driver circuit 9, and the low side is connected to a reference potential GND of the light-emitting diode driving apparatus 50. It should be noted that the switching driver circuit 9 is by way of example of the light-emitting diode driving semiconductor device according to the present embodiment.

A capacitor 13 is connected to high side and low side terminals of the rectifying circuit 1. The capacitor 13 is for filtering a high frequency noise current. If a capacitance value of the capacitor 13 is quite low, a DC voltage Vin has a rectified voltage waveform that is substantially non-smooth. If a capacitance value of the capacitor 13 is sufficiently large, the DC voltage Vin has a smoothed voltage waveform. In the present embodiment, an example will be described where the input voltage waveform is a pulsating voltage waveform.

The switching driver circuit 9 is by way of example of the light-emitting diode driving semiconductor device according to the present embodiment, and is a semiconductor device for providing constant current control over a current through an LED light source 2. As shown in FIG. 1, the switching driver circuit 9 includes at least three terminals (the high-side terminal DRN, a low-side terminal SRCE, and a feedback sensing terminal FB) which are connected externally. The high-side terminal DRN is connected to the high side terminal of the rectifying circuit 1 and an input voltage Vin that has a pulsating voltage waveform is input thereto. The low-side terminal SRCE provides operation reference potential of the switching driver circuit 9, and is connected to a cathode terminal of a rectifier diode 4.

A switching element 5 is configured with a high-voltage n-channel MOSFET, by way of example. A drain terminal of the switching element 5 is connected to the high-side terminal DRN of the switching driver circuit 9. A source terminal of the switching element 5 is connected to the low-side terminal SRCE of the switching driver circuit 9. It should be noted that the switching element 5 is not limited to this but may be any device, such as an IGBT or a bipolar transistor.

A feedback sensing circuit 8 is connected to the feedback sensing terminal FB of the switching driver circuit 9 and receives an output feedback signal output from an output current sensing circuit 7. The output feedback signal is indicated by a potential difference existing across a first resistor 10 that is due to a current Icoil through a choke coil 3. The feedback sensing circuit 8 outputs a feedback dummy signal (IFBdm) from the feedback sensing terminal FB of the switching driver circuit 9. The feedback sensing circuit 8 then outputs to a control circuit 6 a signal that controls the switching of the switching element 5 in response to a signal based on an error between the output feedback signal and the feedback dummy signal (IFBdm).

The operation reference potential of the control circuit 6 is at the same potential as the source terminal of the switching element 5. The control circuit 6 is connected to the low-side terminal SRCE of the switching driver circuit 9. Based on the signal from the feedback sensing circuit 8, the control circuit 6 outputs to the gate terminal of the switching element 5 a drive signal that controls the on and off operation of the switching element 5.

The LED light source 2 includes a plurality of light-emitting diodes (LED). The LED light source 2 may include at least one light-emitting diode. If the LED light source 2 includes a plurality of light-emitting diodes, the light-emitting diodes are not limited to be connected in series but may be connected in a matrix. This applies to the embodiments described below as well.

Another end of the choke coil 3 is connected to the anode terminal side of the LED light source 2. A capacitor 14 is connected across the LED light source 2 to smooth the LED current. The rectifier diode 4 is connected to the cathode terminal side of the LED light source 2 and the low-side terminal SRCE of the switching driver circuit 9 to supply the LED light source 2 with counter electromotive force developed in the choke coil 3.

The output current sensing circuit 7 includes the first resistor 10, a second resistor 11, and a capacitor 12. The first resistor 10 is connected to the low-side terminal SRCE of the switching driver circuit 9 and one end of the choke coil 3. The current Icoil through the choke coil 3 flows through the first resistor 10. The second resistor 11 is connected to one end of the choke coil 3 and the feedback sensing terminal FB of the switching driver circuit 9. The capacitor 12 is connected to the feedback sensing terminal FB of the switching driver circuit 9 and the low-side terminal SRCE. The second resistor 11 and the capacitor 12 form a filter circuit.

Next, operation of a high-side buck converter will be described. The input voltage Vin reaches a predetermined voltage upon application of a voltage to the AC power source and the switching driver circuit 9 turns on, the switching element 5 begins the on and off operation based on a desired timing that is determined by the control circuit 6. As the switching element 5 transitions from the off state to the on state, the input voltage Vin is applied to the choke coil 3 via the switching element 5 and the first resistor 10, decreasing a voltage difference between the drain terminal and the source terminal of the switching element 5 to an on-voltage of the switching element 5. Then, the current Icoil through the choke coil 3 flows through the LED light source 2 and the capacitor 14, and magnetic energy consistent with the flowing current is stored in the choke coil 3.

While the switching element 5 is on, the current flows along a path through the switching element 5, the first resistor 10, and the choke coil 3 to the LED light source 2. The current waveform in the LED light source 2 is a current waveform which has a slope that increases over time and is determined by the input voltage Vin and an inductance value L of the choke coil 3.

Next, as the switching element 5 transitions from the on state to the off state, the current through the switching element 5 is interrupted and counter electromotive force is developed by the magnetic energy stored in the choke coil 3. While the switching element 5 is off, due to the counter electromotive force developed in the choke coil 3 the current flows along a path through the choke coil 3, the LED light source 2, the rectifier diode 4, and the first resistor 10 to the choke coil 3. The current waveform in the LED light source 2 is a current waveform which has a slope that decreases over time and is determined by the inductance value L of the choke coil 3 and the total voltage of a forward voltage of the rectifier diode 4 and a forward voltage of the LED light source 2. As a result, the same current as Icoil through the choke coil 3 flows through the first resistor 10.

Figure 2:
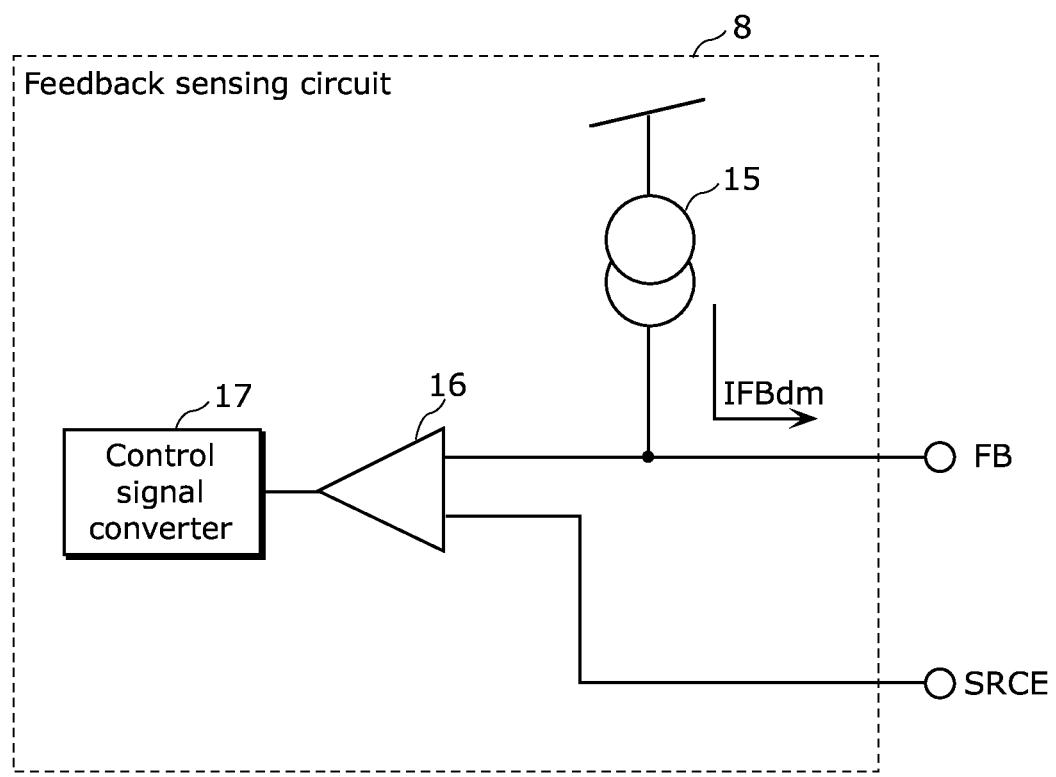
FIG. 2 is a circuit diagram showing an example of a feedback sensing circuit according to the embodiment 1.

An example of the configuration of the feedback sensing circuit 8 will be described, with reference to FIG. 2. FIG. 2 is a circuit diagram showing an example of the feedback sensing circuit 8 according to the present embodiment.

In FIG. 2, a constant current source 15 outputs the feedback dummy current (IFBdm) to the feedback sensing terminal (FB). One of input terminals of an error amplifier 16 is connected to the feedback sensing terminal FB, and the other reference voltage input terminal is connected to the low-side terminal SRCE of the switching driver circuit 9. The output terminal of the error amplifier 16 is connected to a control signal converter 17. The control signal converter 17 outputs to the control circuit 6 a control signal that is based on an output signal from the error amplifier 1. Here, the reference voltage input terminal of the error amplifier 16 is not necessarily connected to the low-side terminal SRCE of the switching driver circuit 9 but may be connected to a constant voltage source or another external terminal of the switching driver circuit 9.

Next, feedback control according to the present embodiment will be described, with reference to FIGS. 1 and 2.

As the coil current Icoil flows through the first resistor 10, a potential difference exists across the first resistor 10. A potential difference across the first resistor 10 can be represented by (Vs−Vc), wherein Vs indicates a voltage at the low-side terminal SRCE of the switching driver circuit 9 and Vc indicates a voltage on a common connection for the first resistor 10 and the choke coil 3. The potential difference across the first resistor 10 can also be represented by the following Eq. 1:

$$Vs-Vc=Icoil \times ROS \qquad \text{Eq. 1}$$

where ROS indicates a resistance value of the first resistor 10.

A potential difference across the second resistor 11 can be represented by (Vfb−Vc), wherein Vfb indicates a voltage at the feedback sensing terminal FB. The feedback dummy current IFBdm flows from the feedback sensing terminal FB to the second resistor 11, and thus the potential difference across the second resistor 11 can also be represented by the following Eq. 2:

$$Vfb-Vc=IFBdm \times RFB \qquad \text{Eq. 2}$$

where RFB indicates a resistance value of the second resistor 11.

Using Eq. 1 and Eq. 2, Eq. 3 is calculated as follows:

$$Vfb-Vs=IFBdm \times RFB-Icoil \times ROS \qquad \text{Eq. 3}$$

Here, the following Eq. 4 is obtained when the voltage on the feedback sensing terminal FB is represented relative to the voltage Vs on the low-side terminal SRCE of the switching driver circuit 9.

$$\text{delta}(VFB)=Vfb-Vs \qquad \text{Eq. 4}$$

Using Eq. 3 and Eq. 4, Eq. 5 is calculated as follows:

$$\text{delta}(VFB)=IFBdm \times RFB-Icoil \times ROS \qquad \text{Eq. 5}$$

The delta (VFB) is a feedback voltage indicating a voltage difference of an input voltage Vfb relative to the operation reference voltage Vs of the error amplifier 16. The delta (VFB) is a positive voltage when a potential difference (IFBdm×RFB) across the second resistor 11 is greater than a potential difference (Icoil×ROS) across the first resistor 10. The delta (VFB) is a negative voltage when a potential difference (IFBdm×RFB) across the second resistor 11 is smaller than a potential difference (Icoil×ROS) across the first resistor 10.

When delta (VFB) is a positive voltage, the error amplifier 16 outputs to the control signal converter 17 a signal for substantially increasing an energy output to the LED light source 2. When delta (VFB) is a negative voltage the error amplifier 16 outputs to the control signal converter 17 a signal for substantially reducing the energy output to the LED light source 2.

An increase in energy output to the LED light source 2 increases the coil current Icoil. Thus, the value of delta (VFB) obtained by Eq. 5 decreases. On the other hand, a decrease in energy output to the LED light source 2 decreases the coil current Icoil. Thus, the value of delta (VFB) obtained by Eq. 5 increases.

Taking advantage of such feedback operation, the switching driver circuit 9 provides control over the switching of the switching element 5 so that a first potential difference and a second potential difference existing across the second resistor 11 which is due to the feedback dummy current are substantially equal. In other words, the switching driver circuit 9 provides the control over the switching of the switching element 5 so that an absolute value of delta (VFB), which is a potential difference between the feedback sensing terminal FB and the low-side terminal SRCE, approaches zero, to maintain an average current of the coil current Icoil to be constant. As a result, the current through the LED light source 2 can be controlled to be a constant current.

While the control circuit 6 implements the control over the switching of the switching element 5 by an output signal from the control signal converter 17, it should be noted that the control means is not by way of limitation.

Figure 3A:
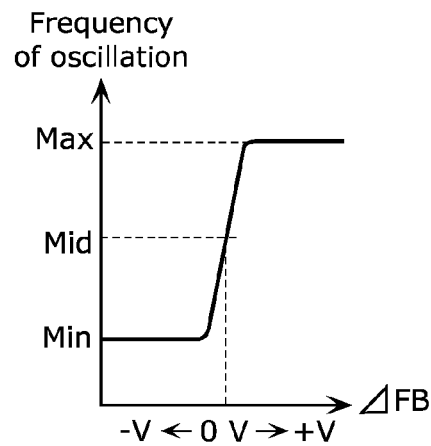
FIG. 3A is a waveform chart showing an example of relationship between a feedback voltage and switching control according to the embodiment 1.
Figure 3B:
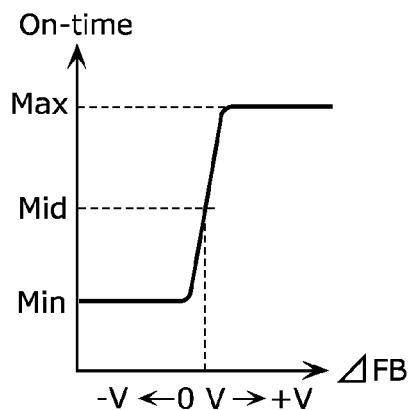
FIG. 3B is a waveform chart showing an example of the relationship between the feedback voltage and the switching control according to the embodiment 1.
Figure 3C:
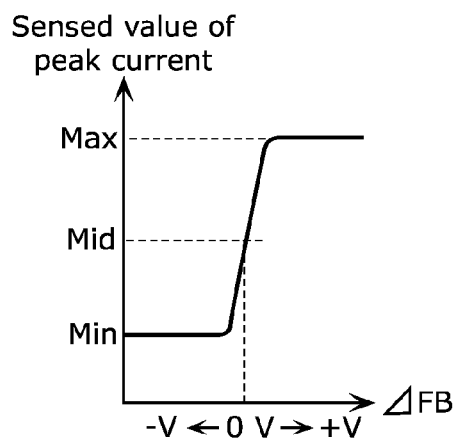
FIG. 3C is a waveform chart showing an example of the relationship between the feedback voltage and the switching control according to the embodiment 1.

FIGS. 3A to 3C are waveform charts showing examples of the relationship between the feedback voltage and the switching control according to the present embodiment.

As shown in FIG. 3A, the method, performed by the switching driver circuit 9, of controlling the switching element 5 may be a method of controlling a switching frequency of the switching element 5 in response to an increase or a decrease of the feedback voltage delta (VFB). As shown in FIG. 3B, the method, performed by the switching driver circuit 9, of controlling the switching element 5 may be a method of controlling the on-time of the switching element 5, which operates at a certain frequency, in response to an increase or a decrease of the feedback voltage delta (VFB). Also, as shown in FIG. 3C, the method, performed by the switching driver circuit 9, of controlling the switching element 5 may be a method of controlling a peak current through the switching element 5, which operates at a certain frequency, in response to an increase or a decrease of the feedback voltage delta (VFB).

The means for changing the switching frequency of the switching element 5 is referred to as pulse frequency modulation (PFM). The means for changing on-duty of the switching of the switching element 5 is referred to as pulse width modulation (PWM). The means for changing the peak value of the current through the switching element 5 is referred to as current-mode PWM. In addition to the above, examples of the control scheme include a fixed off-time control scheme in which the off-time of the switching element 5 is fixed to a preset value, regardless of the control method. Circuits used in the above-mentioned control schemes are known to those skilled in the art, and thus configurations having such control schemes will not be described in detail.

In another embodiment as well as the present embodiment 1, examples of the light-emitting diode driving apparatus include an apparatus, known as an LED bulb or LED lighting, that is integrated into a housing which includes a cylindrical base to which AC or DC power is input.

In the light-emitting diode driving apparatus 50 according to the present embodiment in the above configuration, the operation reference voltages of the switching element 5 and the control circuit 6, which provides the control over the switching of the switching element 5, are at the same potential. This obviates the need for a driver circuit for exchanging signals at different reference potential. Moreover, the light-emitting diode driving apparatus 50 according to the present embodiment allows the switching element 5, the control circuit 6, and the feedback sensing circuit 8 to be formed on a same semiconductor substrate, or achieves implementation of the switching driver circuit 9 that has the switching element 5, the control circuit 6, and the feedback sensing circuit 8 incorporated together in a same package. The above configuration is not limited to the light-emitting diode driving apparatus 50 according to the embodiment 1, but may be applied to light-emitting diode driving apparatuses according to the other embodiments described below.

The feedback sensing circuit 8 corresponds to a negative signal, and thus a high-side buck converter is implemented, achieving high-efficiency drive and reduced size of the light-emitting diode driving apparatus, and space saving. In particular, the light-emitting diode driving apparatus 50 according to the present embodiment is suited to a set which requires for large reduction in size and space saving, such as an LED bulb.

Furthermore, the feedback sensing circuit 8 outputs the control signal to the control circuit 6 so that the first potential difference existing across the first resistor 10 due to a current through the choke coil 3 and the second potential difference existing across the second resistor 11 due to the feedback dummy current are substantially equal, allowing the feedback information to be transferred to the control circuit 6 without directly sensing, at the feedback sensing circuit 8, an output feedback signal which is a negative signal relative to reference potential of the control circuit 6. Since the output feedback signal need not be directly input to the feedback sensing circuit 8, power loss in the choke coil current and the first resistor 10 can be reduced by arbitrarily setting values of the first resistor 10 and the second resistor 11.

Furthermore, the responsivity of the output feedback signal of the output current sensing circuit 7 can be arbitrarily set depending on the second resistor 11 and a capacitance value of the capacitor 12 which is connected between the output terminal of the switching element 5 and the feedback sensing terminal FB, and thus proper feedback responsivity can be chosen depending on power specification. Furthermore, since a feedback period is not determined for each zero-voltage of the input voltage, the feedback control is allowed, without relying on the waveform of the input voltage.

Moreover, the feedback information generated by the error amplifier 16 and the control signal converter 17 in the feedback sensing circuit 8 is transferred to the control circuit 6, thereby controlling an output current of the LED light source 2 to be constant.

Moreover, when the reference voltage Vs of the error amplifier 16 is substantially equal to an operation reference voltage of the control circuit 6, control is made to substantially increase the energy output to the LED light source 2 when an applied voltage to the feedback sensing terminal FB is a positive voltage. When the applied voltage to the feedback sensing terminal FB is a negative voltage, control is made to substantially decrease the energy output to the LED light source 2. Thus, a signal, both positive and negative signals, can be applied to a feedback sensing terminal FB.

The control scheme for the switching element 5 is not limited to the control scheme described above but may be another control scheme. The control circuit 6 provides the control over the switching of the switching element 5 in response to the value of an output signal from the feedback sensing circuit 8, thereby allowing the output current to be controlled to a constant set current.

Effects obtained from the light-emitting diode driving apparatus according to the embodiment 1 are not limited to the light-emitting diode driving apparatus according to the embodiment 1 but similar effects are obtained even from the light-emitting diode driving apparatus according to the embodiment 2 to 6 described below.

Embodiment 2

A light-emitting diode driving apparatus and light-emitting diode driving semiconductor device according to an embodiment 2 will be described. The light-emitting diode driving apparatus according to the present embodiment includes an input voltage sensing circuit, and senses input voltage information and controls a peak current through a switching element to yield an input current waveform according to an input voltage waveform.

Figure 4:
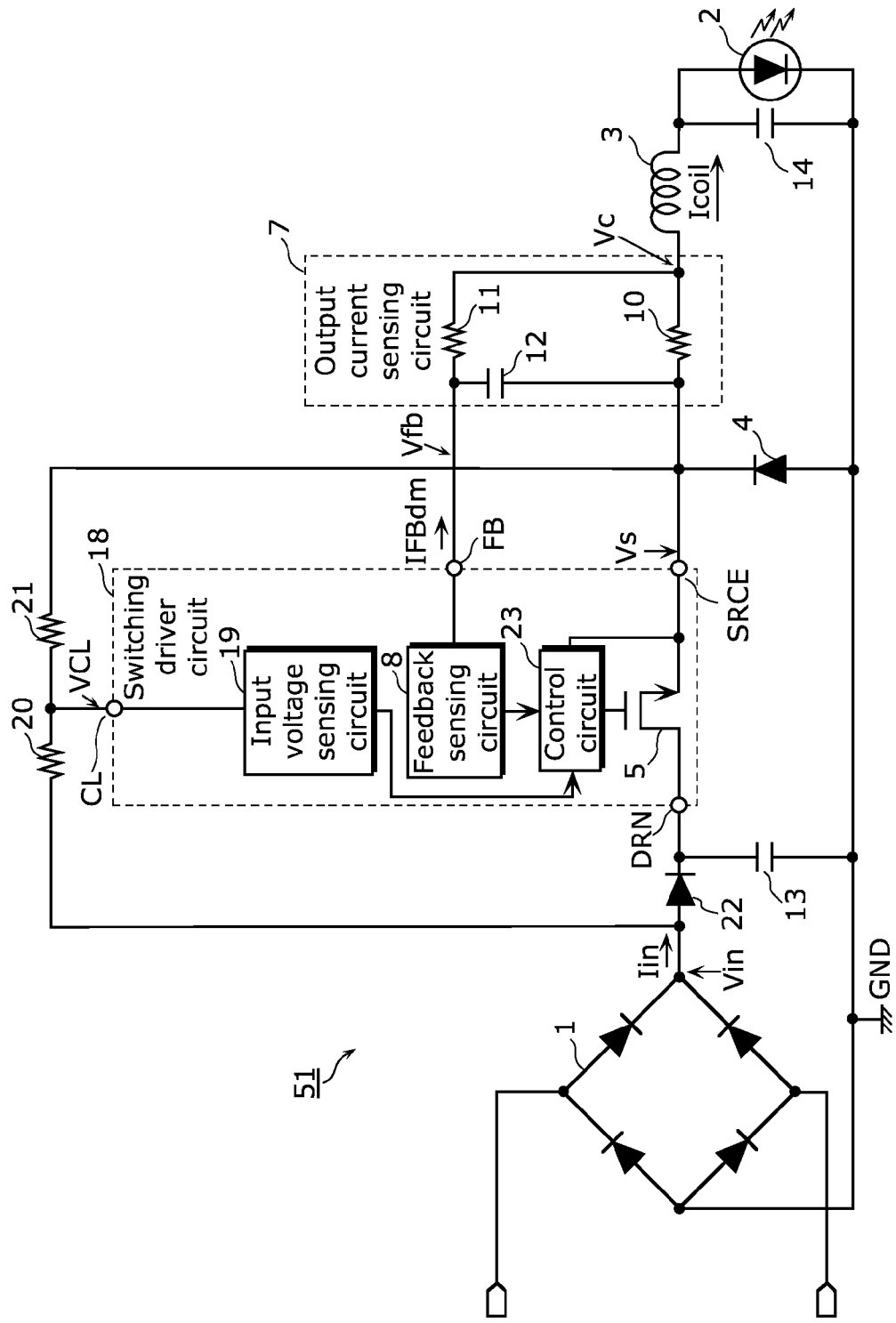
FIG. 4 is a circuit diagram showing examples of a light-emitting diode driving apparatus and a semiconductor device according to an embodiment 2.

FIG. 4 is a circuit diagram showing an example of a light-emitting diode driving apparatus 51 according to the present embodiment. The same reference signs are given in FIG. 4 to refer to the same components as those in FIG. 1, and duplicate description is therefore omitted.

Compared with the light-emitting diode driving apparatus 50 according to the embodiment 1, the light-emitting diode driving apparatus 51 according to the present embodiment is different in configuration of a switching driver circuit 18. Moreover, the light-emitting diode driving apparatus 51 further includes a resistor 20, a resistor 21, and a rectifier diode 22, in addition to the components included in the light-emitting diode driving apparatus 50 according to the embodiment 1.

Compared with the switching driver circuit 9 according to the embodiment 1, the switching driver circuit 18 further includes an input voltage sensing terminal CL and an input voltage sensing circuit 19.

The anode terminal of the rectifier diode 22 is connected to the high side of a rectifying circuit 1. A cathode terminal of the rectifier diode 22 is connected to one end of a capacitor 13. The resistor 20 and the resistor 21 are connected in series between the high side of the rectifying circuit 1 and a low-side terminal SRCE of the switching driver circuit 18. The input voltage sensing terminal CL of the switching driver circuit 18 is connected to a common connection for the resistor 20 and the resistor 21.

Here, The rectifying circuit 1 is, for example, a full-wave rectification circuit, and generates a full-wave rectified voltage from an AC voltage. The capacitor 13 is for filtering a high frequency noise current. If the capacitor 13 has a quite low capacitance value, a DC voltage Vin through the capacitor 13 has a rectified voltage waveform which is substantially non-smooth. If a capacitance value of the capacitor 13 is sufficiently large, the DC voltage Vin has a smoothed voltage waveform. The waveform of an input voltage Vin is a pulsating waveform or a smoothed waveform, depending on a capacitance value of the capacitor 13. The rectifier diode 22 is used to convert the input voltage waveform into a pulsating waveform and apply the input voltage information that is proportional to the pulsating input voltage waveform to the input voltage sensing terminal CL. In other words, the rectifier diode 22 prevents a full-wave rectified input voltage waveform from being smoothed by the capacitor 13. Thus, the rectifier diode 22 is unnecessary in the case where the capacitor 13 has a quite low capacitance value and the DC voltage Vin has a rectified voltage waveform that is substantially non-smooth.

In the present embodiment, the input voltage information is divided by the resistor 20 and the resistor 21 and resultant voltage information is applied to the input voltage sensing terminal CL. However, the present invention is not limited thereto. The input voltage information may be applied to operation reference potential SRCE of the switching driver circuit 18. For example, the input voltage information may be applied as the current information to the input voltage sensing terminal CL, or may be directly applied to the input voltage sensing terminal CL, without being divided by the resistance. Means for inputting a signal by the current information or means for making an element at a voltage application terminal high-voltage tolerant in order to apply a high voltage thereto are well known to those skilled in the art, and, thus, configurations therefor will not be described in detail.

Based on the input voltage information input from the input voltage sensing terminal CL, the input voltage sensing circuit 19 outputs to a control circuit 23 a signal that controls a sensed value of a peak current through a switching element 5.

Based on an output signal of an error amplifier 16, a feedback sensing circuit 8 outputs a signal that controls the frequency of oscillation of the switching element 5 to the control circuit 23 via a control signal converter 17.

Next, relationship between the input voltage waveform and the input current waveform of the light-emitting diode driving apparatus 51 according to the present embodiment in the above configuration will be described, with reference to FIG. 5.

Figure 5:
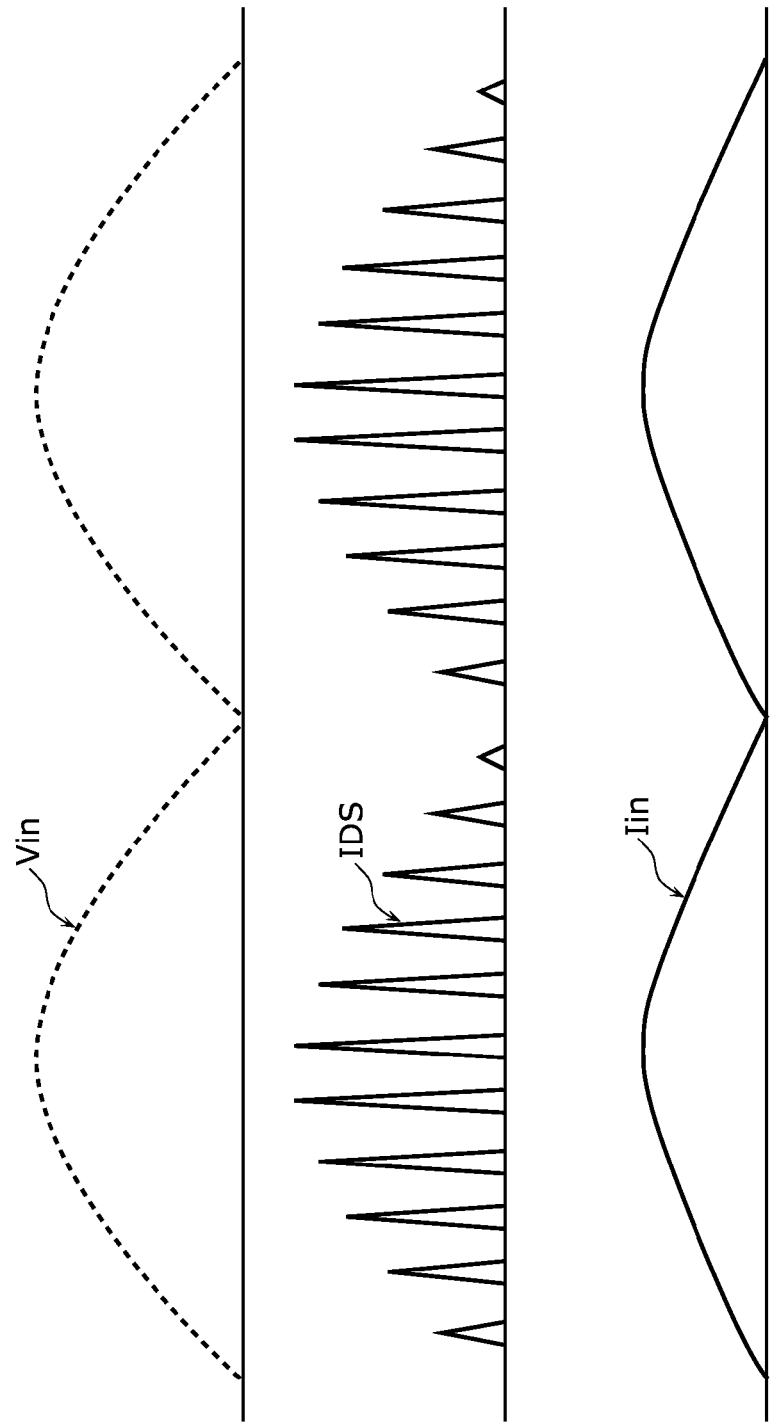
FIG. 5 is a waveform chart showing examples of an input voltage waveform and a drain current waveform, and an input current waveform according to the embodiment 2.

In FIG. 5, Vin indicates the input voltage waveform, which is a pulsating waveform (a sinusoidal waveform). IDS indicates a current waveform through the switching element 5. Iin indicates the input current waveform.

The switching driver circuit 18 provides control such that the sensed value of the peak current through the switching element 5 is substantially proportional to the waveform of the input voltage Vin, to yield the input current waveform that is substantially proportional to the input voltage waveform of the input voltage Vin, thereby enhancing the power factor.

Next, configuration and means, in a high-side buck converter circuit structure, for controlling, by the input voltage sensing circuit 19, the input voltage information based on operation reference potential SRCE of the switching driver circuit 18 which is different from reference potential GND of the light-emitting diode driving apparatus 51 will be described, with reference to FIGS. 6, 7A, and 7B.

Figure 6:
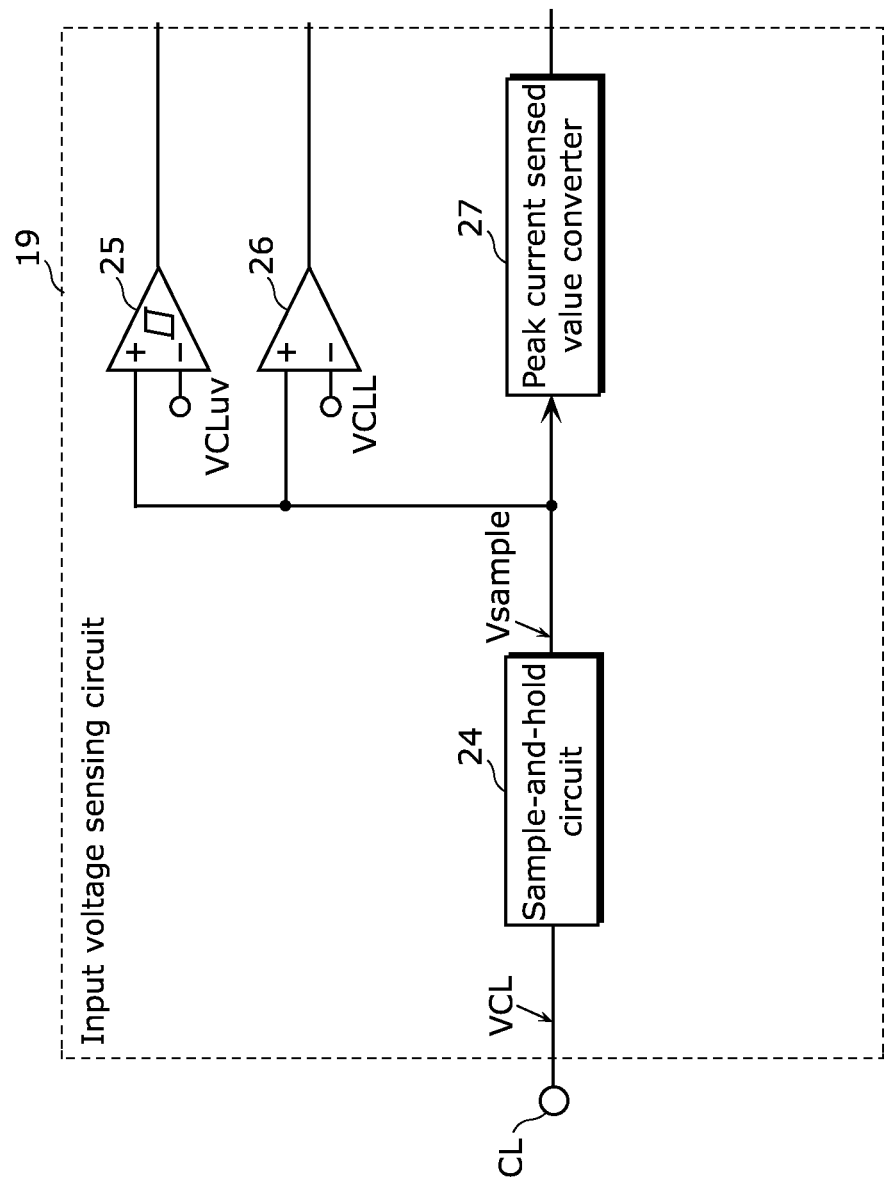
FIG. 6 is a circuit diagram showing an example of an input voltage sensing circuit according to the embodiment 2.
Figure 7A:
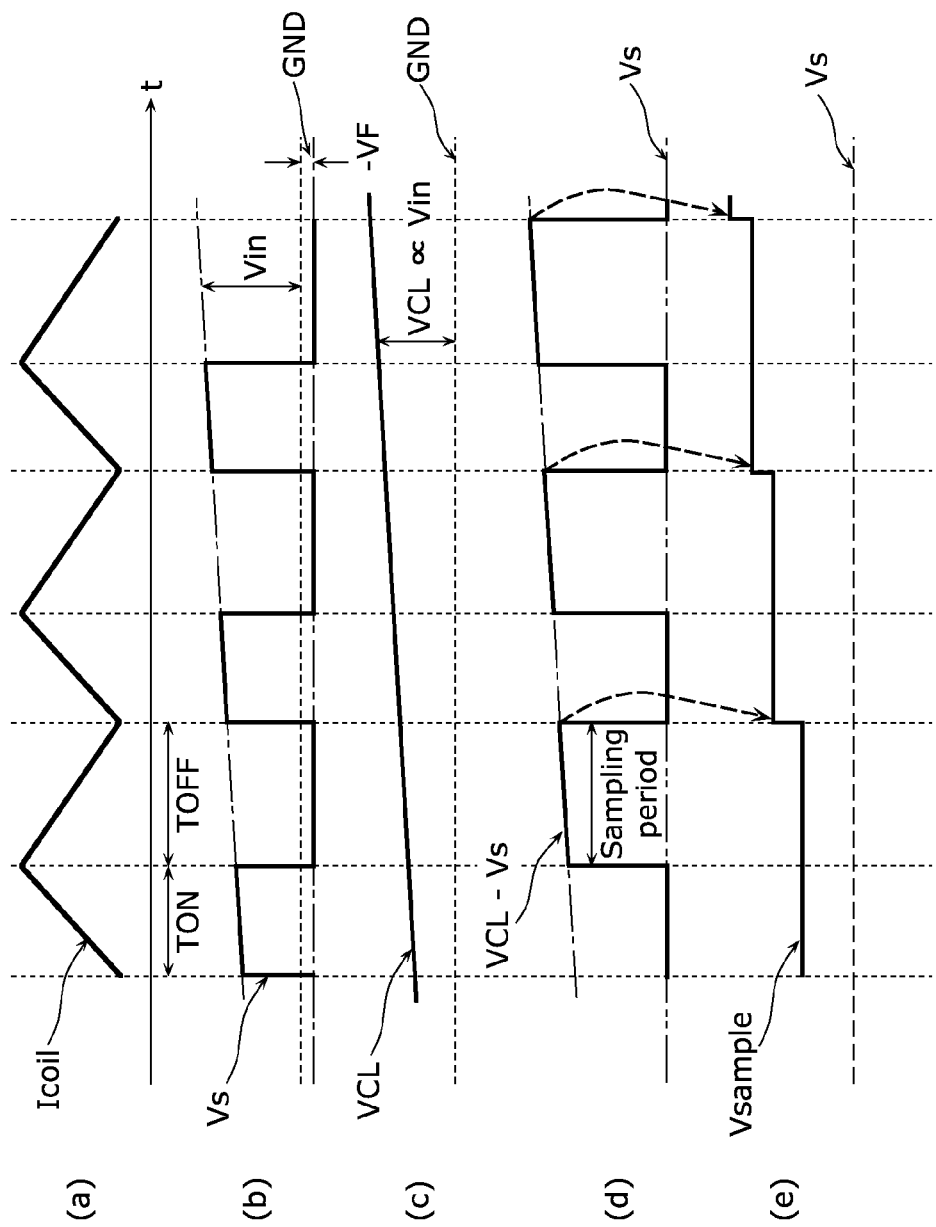
FIG. 7A is a diagram showing waveforms when components included in the light-emitting diode driving apparatus according to the embodiment 2 are in operation.

FIG. 6 is a circuit diagram showing an example of the input voltage sensing circuit 19 according to the present embodiment. In FIG. 6, the input voltage sensing terminal CL is connected to a sample-and-hold circuit 24. The input voltage information sampled by the sample-and-hold circuit 24 is input as a sample voltage Vsample to a first comparator 25, a second comparator 26, and the peak current sensed value converter 27.

A first reference voltage (VCLuv) that has a hysteresis value (hysteresis property) is input to another input terminal of the first comparator 25. The first comparator 25 outputs a switching grant period signal to the control circuit 23. The switching grant period signal grants the switching of the switching element 5 if the sample voltage Vsample is at or above a first reference level and prohibits the switching of the switching element 5 if the sample voltage Vsample is below the hysteresis value of the first reference level.

A second reference voltage (VCLL) is input to another input terminal of the second comparator 26. The second reference voltage is set higher than the first reference voltage. Then, if the sample voltage Vsample is at or below a second reference level, the second comparator 26 outputs to the control circuit 23 a signal which holds the on-period of the switching of the switching element 5 to a minimum.

The peak current sensed value converter 27 outputs to the control circuit 23 a signal which changes the sensed value of the peak current through the switching element 5 in response to the sample voltage Vsample.

A role of the sample-and-hold circuit 24 of the input voltage sensing circuit 19 according to the present embodiment in the above configuration will be described, with reference to FIGS. 7A and 7B. FIGS. 7A and 7B are diagrams showing waveforms when the components included in the light-emitting diode driving apparatus 51 according to the present embodiment are in operation. More particularly, the figures show the operations of the components in the case where the input voltage Vin has a full-wave rectified waveform and increases in a sinusoidal waveform.

First, an example of control provided by the sample-and-hold circuit 24 will be described, with reference to FIG. 7A. The waveform (a) of FIG. 7A is of a current Icoil which flows through a choke coil 3 due to the switching of the switching element 5 in a continuous mode. TON indicates the on-period of the switching element 5, and TOFF indicates the off-period of the switching element 5. The forward direction of the waveform (a) of FIG. 7A corresponds to the forward direction of the flow of the current Icoil through the choke coil 3 indicated by the direction of the arrow shown in FIG. 4. The waveform (b) is of the voltage on the operation reference potential terminal SRCE of the switching driver circuit 18 relative to the reference potential GND of the light-emitting diode driving apparatus in FIG. 4, namely, an operation reference voltage Vs. The waveform (c) is of the voltage on the input voltage sensing terminal CL relative to the reference potential GND of the light-emitting diode driving apparatus in FIG. 4, namely, an input voltage VCL. The waveform (d) is of a voltage on the input voltage sensing terminal CL relative to the operation reference potential terminal SRCE of the switching driver circuit 18 in FIG. 4, namely, a voltage (VCL−Vs). The waveform (e) is of an output voltage of the sample-and-hold circuit 24 relative to the operation reference potential terminal SRCE of the switching driver circuit 18 in FIG. 4, namely, a voltage (Vsample−Vs).

The waveforms at the components during the period TON where the switching element 5 is on will be described.

The current Icoil through the choke coil 3 has a current waveform which linearly increases as indicated by the waveform (a). The operation reference voltage Vs relative to the reference potential GND is, as indicated by the waveform (b), at the same potential as an input power supply voltage Vin (Ignoring voltage drop due to a resistive component of the switching element 5.). The input voltage VCL to the input voltage sensing terminal CL rises in proportional to the input voltage Vin as indicated by the waveform (c). Representing the input voltage VCL to the input voltage sensing terminal CL, relative to the operation reference voltage Vs of the switching driver circuit 18, a potential difference is not present as indicated by the waveform (d). In the period TON where the switching element 5 is on as indicated by the waveform (e), the sample-and-hold circuit 24 does not sense the input voltage VCL input to the input voltage sensing terminal CL and outputs, as the sample voltage Vsample, a voltage sensed in the previous period TOFF.

Next, the waveforms at the components in the period TOFF where the switching element 5 is off will be described. The current Icoil through the choke coil 3 has a current waveform which linearly reduces as indicated by the waveform (a). Due to the counter electromotive force developed in the choke coil 3, the operation reference voltage Vs relative to the reference potential GND is a negative voltage by a forward voltage VF of a rectifier diode 4, as indicated by the waveform (b). The input voltage VCL to the input voltage sensing terminal CL rises in proportional to the input voltage Vin. Representing the input voltage VCL to the input voltage sensing terminal CL relative to the operation reference voltage Vs of the switching driver circuit 18, potential is generated as indicated by the waveform (d). The sample-and-hold circuit 24 samples the voltage VCL input to the input voltage sensing terminal CL in the period TOFF where the switching element 5 is off, and outputs the sampled voltage VCL to the sample voltage Vsample when the switching element 5 has switched from the off state to the on state as indicated by the waveform (e).

As described above, the sample-and-hold circuit 24 does not sense the voltage VCL during the period where the switching element 5 is on. Due to this, the voltage sensed in the previous period TOFF is held and output as the sample voltage Vsample to the subsequent circuit. The sample-and-hold circuit 24 samples the voltage VCL in the period where the switching element 5 is off. Due to this, the voltage sensed in the previous period TOFF is held and output as the sample voltage Vsample to the subsequent circuit. Then, the sample-and-hold circuit 24 updates the sample voltage Vsample with the sampled voltage VCL when the switching element 5 has switched from the off state to the on state.

The sample-and-hold circuit 24 may provide control other than that descried in the above example. Another example of the control provided by the sample-and-hold circuit 24 of the input voltage sensing circuit 19 according to the present embodiment will be described, with reference to FIG. 7B.

Figure 7B:
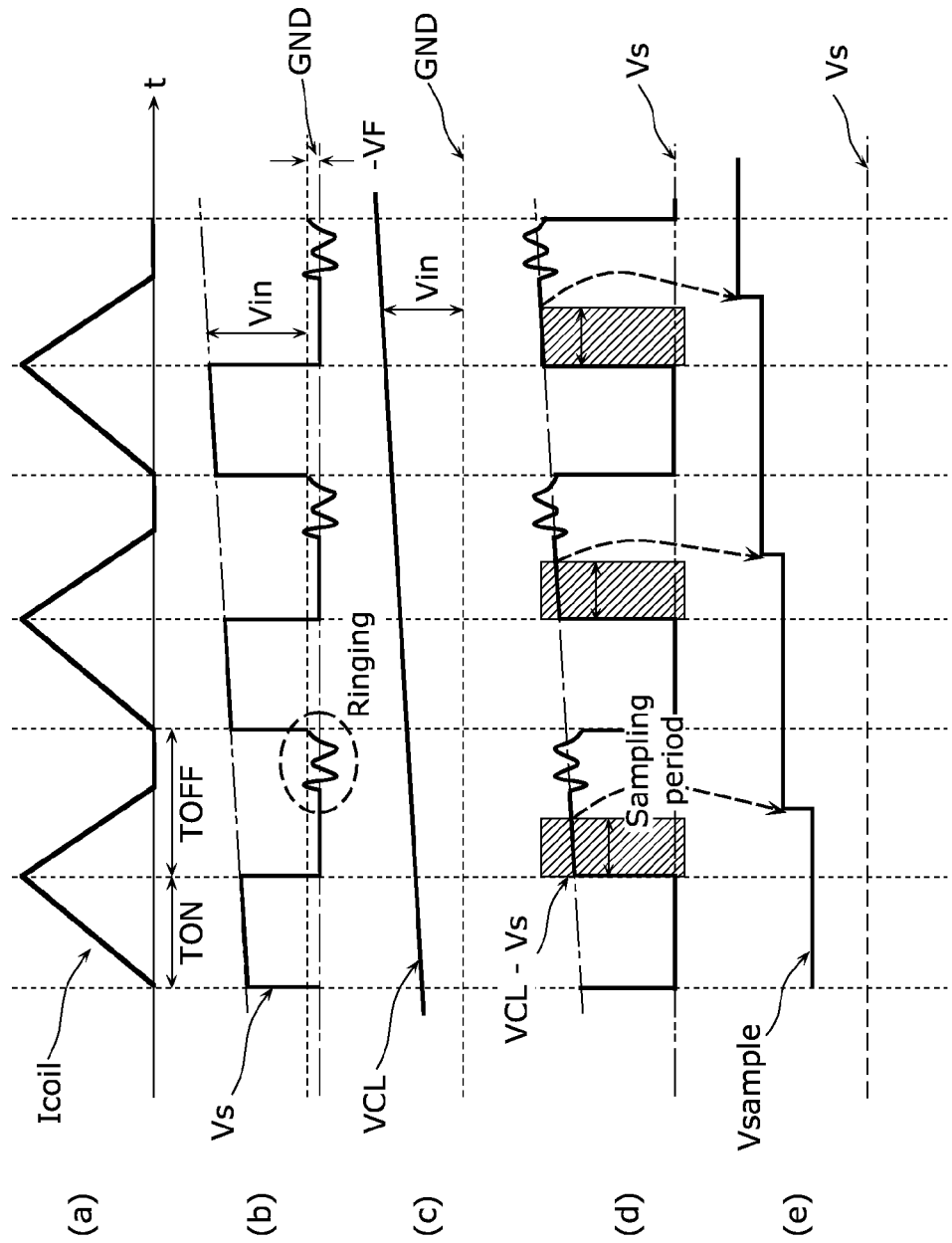
FIG. 7B is a diagram showing waveforms when the components included in the light-emitting diode driving apparatus according to the embodiment 2 are in operation.

The waveform (a) of FIG. 7B is of a current Icoil which flows through a choke coil 3 due to the switching of the switching element 5 in the non-continuous mode. TON indicates the on-period of the switching element 5, and TOFF indicates the off-period of the switching element 5. The forward direction of the waveform (a) of FIG. 7B corresponds to the forward direction of the flow of the current Icoil through the choke coil 3 indicated by the direction of the arrow shown in FIG. 4. The waveform (b) is of the voltage on the operation reference potential terminal SRCE of the switching driver circuit 18 relative to the reference potential GND of the light-emitting diode driving apparatus in FIG. 4, namely, an operation reference voltage Vs. The waveform (c) is of the voltage on the input voltage sensing terminal CL relative to the reference potential GND of the light-emitting diode driving apparatus in FIG. 4, namely, an input voltage VCL. The waveform (d) is of a voltage on the input voltage sensing terminal CL relative to the operation reference potential terminal SRCE of the switching driver circuit 18 in FIG. 4, namely, a voltage (VCL−Vs). The waveform (e) is of an output voltage of the sample-and-hold circuit 24 relative to the operation reference potential terminal SRCE of the switching driver circuit 18 in FIG. 4, namely, a voltage (Vsample−Vs).

The waveforms at the components in the period TON where the switching element 5 is on will be described.

The current Icoil through the choke coil 3 has a current waveform which linearly increases as indicated by the waveform (a). The operation reference voltage Vs relative to the reference potential GND is, as indicated by the waveform (b), at the same potential as an input power supply voltage Vin (Ignoring voltage drop due to a resistive component of the switching element 5.). The input voltage VCL to the input voltage sensing terminal CL rises in proportional to the input voltage Vin as indicated by the waveform (c). Representing the input voltage VCL to the input voltage sensing terminal CL, relative to the operation reference voltage Vs of the switching driver circuit 18, a potential difference is not present as indicated by the waveform (d). In the period TON where the switching element 5 is on as indicated by the waveform (e), the sample-and-hold circuit 24 does not sense the input voltage VCL input to the input voltage sensing terminal CL and outputs, as the sample voltage Vsample, a voltage sensed in the previous period TOFF.

Next, the waveforms at the components in the period TOFF where the switching element 5 is off will be described. The current Icoil through the choke coil 3 has a current waveform which linearly reduces as indicated by the waveform (a). Since the switching of the switching element 5 is in the non-continuous mode, Icoil does not flow once all the counter electromotive force stored in the choke coil 3 is released, ending up with a substantially zero current. Moreover, due to the counter electromotive force developed in the choke coil 3, the operation reference voltage Vs relative to the reference potential GND is a negative voltage by a forward voltage VF of a rectifier diode 4, as indicated by the waveform (b). Once all the counter electromotive force stored in the choke coil 3 is released, the switching driver circuit 18 is unable to hold the forward voltage VF of the rectifier diode 4, and thus the waveform of the operation reference voltage Vs rings due to parasitic capacitance, for example. The input voltage VCL to the input voltage sensing terminal CL rises in proportional to the input voltage Vin as indicated by the waveform (c). Representing the input voltage VCL to the input voltage sensing terminal CL relative to the operation reference voltage Vs of the switching driver circuit 18, potential is generated as indicated by the waveform (d). Although the input voltage VCL has a stable waveform in a period where a current flows through the choke coil 3 due to release of counter electromotive force, the input voltage VCL has a ringing waveform after the end of release of the counter electromotive force.

The sample-and-hold circuit 24 has a preset sampling period which starts after the switching element 5 has been turned off, and samples the voltage VCL input to the input voltage sensing terminal CL in the sampling period as indicated by the waveform (e), and outputs the sampled voltage VCL as the sample voltage Vsample (a sampling signal) at the end of the sampling period.

As described above, the sample-and-hold circuit 24 does not sense the voltage VCL during the period where the switching element 5 is on. Due to this, the voltage sensed in the previous period TOFF is held and output as the sample voltage Vsample to the subsequent circuit. The sample-and-hold circuit 24 has the preset sampling period which starts after the switching element 5 has been turned off, and samples the voltage VCL in the sampling period. Due to this, the sample-and-hold circuit 24 holds the voltage sensed in the previous period TOFF and output it as the sample voltage Vsample to the subsequent circuit. Then, the sample-and-hold circuit 24 updates the sample voltage Vsample with the sampled voltage VCL at the end of the sampling period. Since the sample-and-hold circuit 24 has the sampling period, the voltage VCL can be accurately sensed without being affected by jitter in input waveform generated during periods other than the preset sampling period.

Figure 8A:
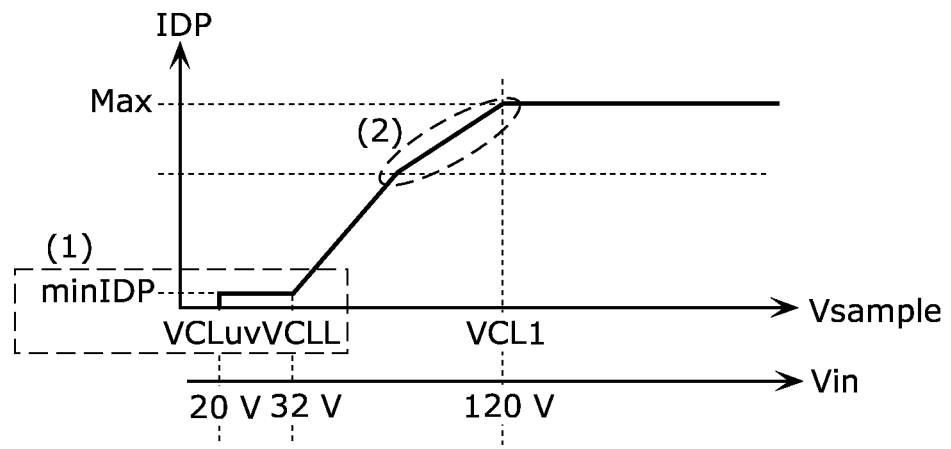
FIG. 8A is a circuit diagram showing an example of a relationship between an input voltage and a sensed value of a peak current in the embodiment 2.
Figure 8B:
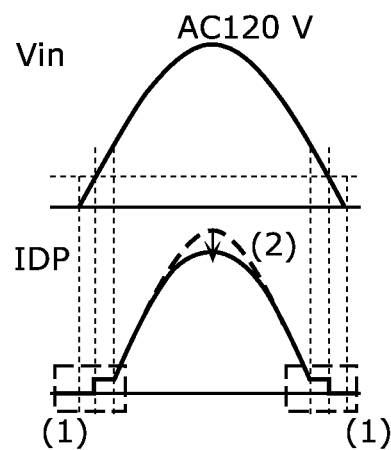
FIG. 8B is a circuit diagram showing an example of the relationship between the input voltage and the sensed value of the peak current in the embodiment 2.

Next, roles of the first comparator 25, the second comparator 26, and the peak current sensed value converter 27 included in the input voltage sensing circuit 19 according to the present embodiment will be described, with reference to FIGS. 8A and 8B. FIGS. 8A and 8B are circuit diagrams showing examples of the relationship between the input voltage and the sensed value of the peak current according to the embodiment 2 of the present invention.

In FIG. 8A, the input voltage Vin and a voltage level of the sample voltage Vsample proportional to the input voltage Vin are indicated on the horizontal axis, and the sensed value IDP of the peak current through the switching element 5 is indicated on the vertical axis.

First, operation of the switching element 5 in the region (1) will be described. The on and off operation of the switching element 5 is prohibited until the sample voltage Vsample reaches the first reference voltage VCLuv of the first comparator 25. As a result, the sensed value IDP of the peak current through the switching element 5 is at a zero level. Thereafter, when the sample voltage Vsample is greater than or equal to the first reference voltage VCLuv of the first comparator 25, the on and off operation of the switching element 5 is allowed. However, the sample voltage Vsample is less than the second reference voltage VCLL that is set higher than the first reference voltage VCLuv of the second comparator 26, and thus the on-period for the switching of the switching element 5 is held to a minimum. As a result, the sensed value IDP of the peak current through the switching element 5 is held to a minimum minIDP. Then, when the sample voltage Vsample increases greater than the second reference voltage VCLL, the peak current sensed value converter 27 linearly varies the sensed value IDP of the peak current through the switching element 5 at a first rate, in response to a voltage value of the sample voltage Vsample.

In the region (2), when the voltage value of the sample voltage Vsample exceeds a threshold (not shown) preset by the peak current sensed value converter 27, the peak current sensed value converter 27 linearly varies rates of changes of the sample voltage Vsample and the sensed value IDP of the peak current at a second rate set slower than the first rate. Then, when the voltage value of the sample voltage Vsample reaches an upper limit VCL1 that is preset by the peak current sensed value converter 27, the peak current sensed value converter 27 holds the sensed value IDP of the peak current which flows through the switching element 5 to a value Max. While the values of the input voltage Vin that correspond to the reference voltages VCLuv, VCLL, and VCL1 are indicated in FIG. 8A, it should be noted that the relationship between the reference voltage and the input voltage Vin is not limited to these values.

Next, relationship between the input voltage Vin and the sensed value IDP of the peak current through the switching element 5 will be described, with reference to FIG. 8B. The input voltage Vin is indicated on the top portion of FIG. 8B, which has, in the example, a pulsating waveform where a peak voltage is AC 120V. The waveform of the peak current that has the sensed value IDP and corresponds to the input voltage Vin is indicated on the bottom portion. When the input voltage Vin is very low in the region (1), the peak current sensed value converter 27 deactivates the switching of the switching element. When the input voltage is very low, the switching of the switching element is deactivated to prevent switching control instability where the power supply voltage of the switching driver circuit 18 is unlikely to stably be obtained. Moreover, limiting an output current of the switching element 5 to a lowest value at low input voltages allows limiting the input current to low. As a result, this can prevent power factor deterioration caused when a high input voltage is in use, which is due to a fact that the input current reaches a maximum earlier in time, as compared to when a low input voltage is in use, and the input current does not flow during a falling edge of a sinusoidal waveform of the input voltage. Moreover, slowing the rates of changes of the sample voltage Vsample and the sensed value IDP of the peak current in the region (2) when a high input voltage is in use can prevent the peak current from increasing more than necessary, due to a delay time of the peak current value detection, as indicated by the dotted waveform.

In the light-emitting diode driving apparatus 51 according to the present embodiment in the above configuration, the input voltage sensing circuit 19 senses the input voltage information and controls the peak current through the switching element 5 to yield the input current waveform corresponding to the input voltage waveform and enhance the power factor. Furthermore, the control circuit 23 provides control to substantially proportionate the input voltage waveform and the input current waveform to each other, thereby increasing a conduction angle of the input current, so that the input current waveform changes substantially in phase with the input voltage waveform. This allows enhancement of the power factor.

Moreover, in the configuration where the switching element 5, the input voltage sensing circuit 19, and the control circuit 23 are disposed on the high side of the input voltage, the voltage applied to an input terminal CL of the input voltage sensing circuit 19 is sensed only in the period where the switching element 5 is turned off. Thus, accurate sensing of the input voltage information by the input voltage sensing circuit 19 is allowed. Furthermore, since the input voltage sensing circuit 19 senses an input signal only in the preset sampling period that is after the switching element 5 is turned off in the on and off operation, the input voltage information can be accurately sensed without being affected by jitter in input waveform generated during periods other than the preset sampling period.

Moreover, the sensed value of the peak current through the switching element 5 properly changes due to the input voltage sensing circuit 19, and thus the control over the switching of the switching element 5 can be prohibited when there is little voltage difference between the input voltage and the output voltage or when the input voltage is very low. Thus, stable switching control of the switching element 5 is allowed. Furthermore, limiting the output current of the switching element 5 to a lowest at low input voltages allows limiting the input current to low. Thus, the input voltage waveform and the input current waveform are made similar, thereby enhancing the power factor.

Moreover, the sensed value of the peak current through the switching element 5 can linearly be varied in response to the input voltage, and an increase of the peak current due to the delay time of the peak current value detection can be reduced by slowing the rates of changes of the sample voltage Vsample and the sensed value IDP of the peak current at high input voltages. Additionally, the upper limit of the peak current is restricted, preventing currents above its rating from flowing through the switching element and so on.

The light-emitting diode driving apparatus 51 according to the present embodiment can achieve effects similar to those obtained from the embodiment 1.

Embodiment 3

A light-emitting diode driving apparatus and light-emitting diode driving semiconductor device according to an embodiment 3 will be described. The light-emitting diode driving apparatus according to the embodiment 3 of the present invention causes an input voltage sensing circuit to sense an input peak value and switch the control rates of the input voltage and a peak current which flows through a switching element.

Compared with the embodiment 2, the light-emitting diode driving apparatus according to the present embodiment includes an input voltage sensing circuit 41 in a different configuration.

Figure 9:
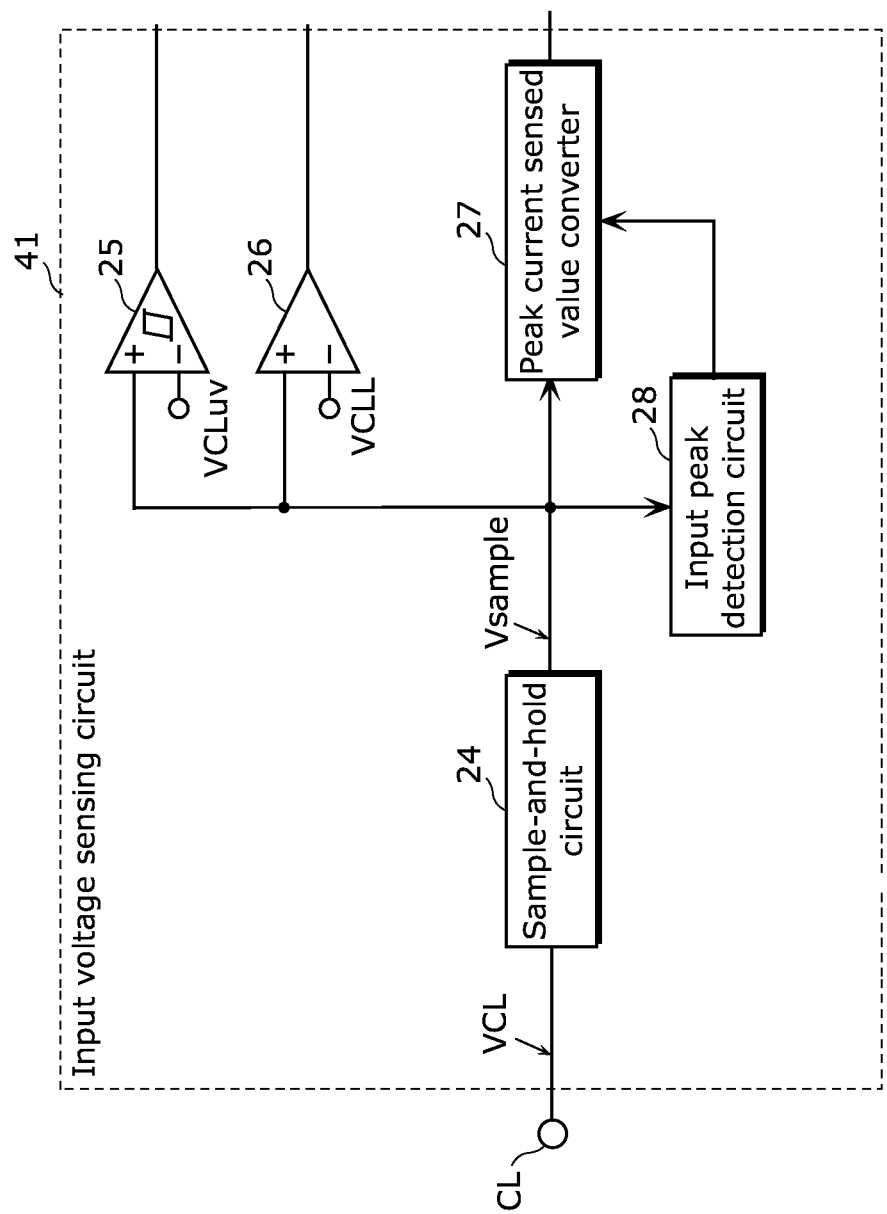
FIG. 9 is a circuit diagram showing an example of an input voltage sensing circuit according to an embodiment 3.

FIG. 9 is a circuit diagram showing an example of the input voltage sensing circuit 41 according to the present embodiment.

An input peak detection circuit 28 senses a peak of a sample voltage Vsample for each cycle of the pulsating waveform of the full-wave rectified input voltage. If the peak voltage is at or above a first input peak reference level that is previously set, the input peak detection circuit 28 switches preset control rates of the sample voltage Vsample and a sensed value IDP of a peak current from a first control rate to a second control rate that is set slower than the first control rate, to output a signal carrying the control rate Rate-2 to the peak current sensed value converter 27.

Operation of the light-emitting diode driving apparatus according to the present embodiment in the above configuration will be described, with reference to FIGS. 10A, 10B, and 11.

Figure 10A:
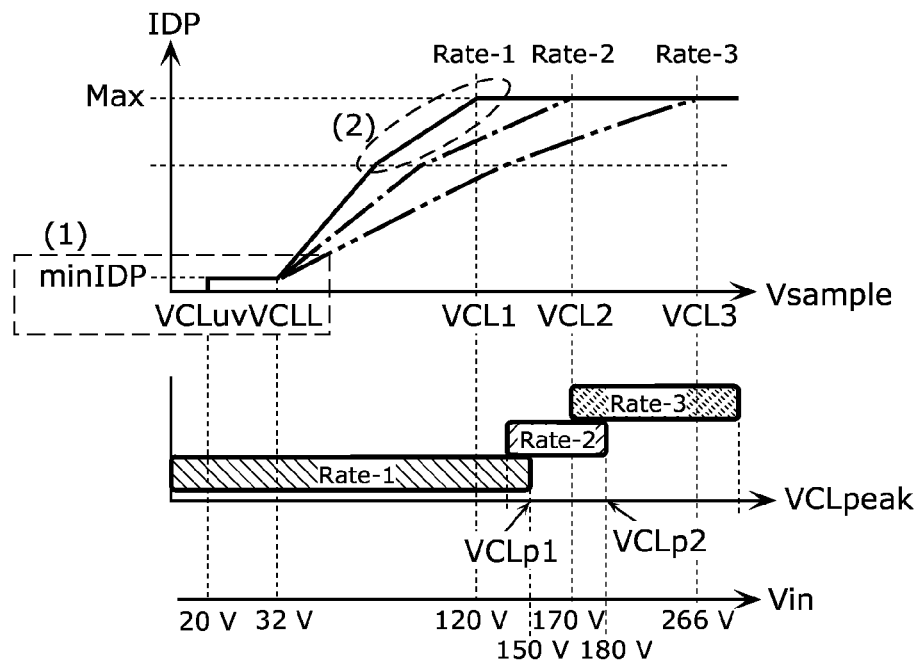
FIG. 10A is a circuit diagram showing an example of relationship between an input voltage and a sensed value of a peak current in the embodiment 3.
Figure 10B:
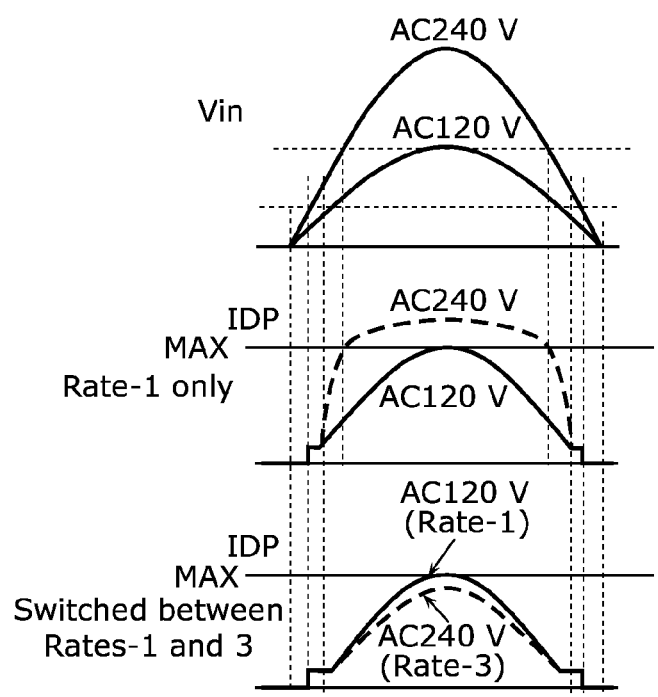
FIG. 10B is a circuit diagram showing an example of the relationship between the input voltage and the sensed value of the peak current in the embodiment 3.
Figure 11:
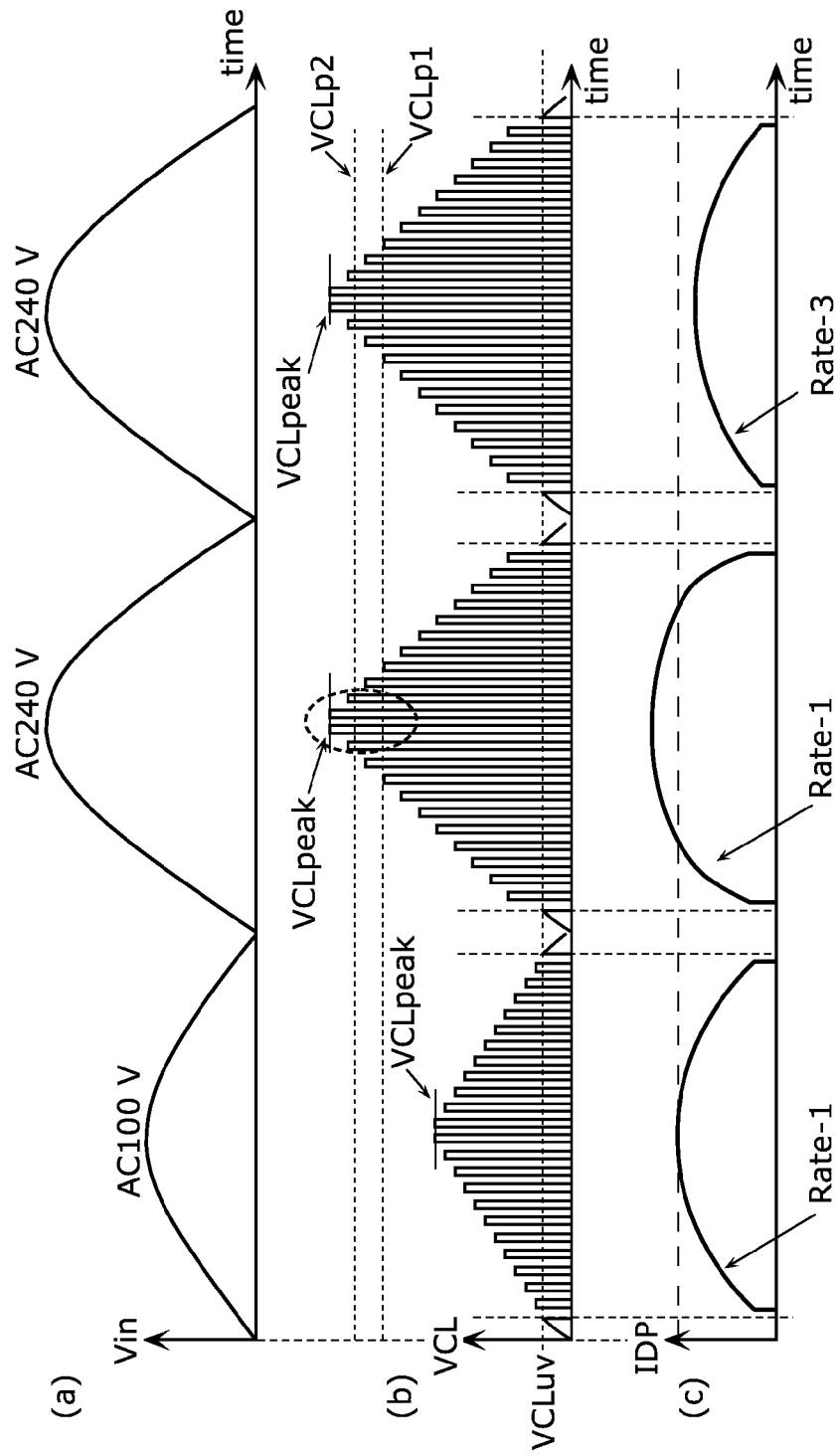
FIG. 11 is a circuit diagram showing an example of relationship between the input voltage, an input sense voltage, and the sensed value of the peak current in the embodiment 3.

Indicated on the horizontal axis in FIG. 10A are voltage levels of the sample voltage Vsample at the top, a peak voltage VCLpeak of the sample voltage Vsample per cycle in the middle, and an input voltage Vin proportional to the sample voltage Vsample at the bottom. Indicated on the vertical axis are the sensed value IDP of the peak current through a switching element 5 at the top, and control rates of the sample voltage Vsample and the sensed value IDP of the peak current in the middle.

The regions (1) and (2) on the top graph of FIG. 10A are the same as those in the embodiment 2, and thus detailed description will be omitted. In the present embodiment, a case will be described where there are three control rates of the sample voltage Vsample and the sensed value IDP of the peak current. A first control rate Rate-1 is indicated by the solid line, a second control rate Rate-2 is indicated by the dot-dash line, and a third control rate Rate-3 is indicated by the dot-dot-dash line.

The input peak detection circuit 28 senses the peak voltage VCLpeak, per cycle, of the sample voltage Vsample that is proportional to the full-wave rectified input voltage Vin. Then, if the peak voltage VCLpeak is at or above a first input peak reference level VCLp1 that is previously set, the input peak detection circuit 28 switches the preset control rates of the sample voltage Vsample and the sensed value IDP of the peak current from the first control rate Rate-1 to the second control rate Rate-2 that is set slower than the first control rate Rate-1. Then, the input peak detection circuit 28 outputs a signal carrying the second control rate Rate-2 to the peak current sensed value converter 27.

Moreover, if the peak voltage VCLpeak is below a hysteresis value of the preset first input peak reference level VCLp1, the input peak detection circuit 28 switches the preset control rates of the sample voltage Vsample and the sensed value IDP of the peak current from the second control rate Rate-2 to the first control rate Rate-1 that is set steeper than the second control rate Rate-2. Then, the input peak detection circuit 28 outputs a signal carrying the first control rate Rate-1 to the peak current sensed value converter 27.

Furthermore, if the peak voltage VCLpeak is at or above a second input peak reference level VCLp2 that is previously set, the input peak detection circuit 28 switches the preset control rates of the sample voltage Vsample and the sensed value IDP of the peak current to the third control rate Rate-3 that is set slower than the second control rate Rate-2. Then, the input peak detection circuit 28 outputs a signal carrying the third control rate Rate-3 to the peak current sensed value converter 27.

If the peak voltage VCLpeak is at or below a hysteresis value of the preset second input peak reference level VCLp2, the input peak detection circuit 28 switches the preset control rates of the sample voltage Vsample and the sensed value IDP of the peak current from the third control rate Rate-3 to the second control rate Rate-2 that is set steeper than the third control rate Rate-3. Then, the input peak detection circuit 28 outputs a signal carrying the second control rate Rate-2 to the peak current sensed value converter 27.

While the values of the input voltage Vin that correspond to the reference voltages VCLuv, VCLL, VCL1, VCL2, VCL3, VCLp1, and VCLp2 are indicated in FIG. 10A, it should be noted that the relationship between the reference voltage and the input voltage Vin is not limited to these values. Moreover, the example has been described where there are three control rates of the sample voltage Vsample and the sensed value IDP of the peak current, the number of control rates is not limited to three.

Next, relationship between the input voltage Vin and the sensed value of the peak current through the switching element 5 will be described, with reference to FIG. 10B. The input voltage Vin is indicated on the top portion of FIG. 10B, which has, in the example, pulsating waveforms where peak voltages are AC 120V and AC 240V. Waveforms of the peak current that has the sensed value IDP in the case where the input peak detection circuit 28 is absent are indicated on the middle portion of FIG. 10B. Waveform of the peak current that has the sensed value IDP in the case where the input peak detection circuit 28 is present are indicated on the bottom portion of FIG. 10B.

When the peak value of the input voltage Vin is AC 120V, the control rates of the sample voltage Vsample and the sensed value IDP of the peak current are the first control rate Rate-1 from the relationship illustrated in FIG. 10A. When the peak value of the input voltage Vin is AC 240V and if the input peak detection circuit 28 is absent, the waveform of the peak current that has the sensed value IDP reaches a value Max in the rise of a pulsating waveform of the input voltage Vin as indicated by the dashed waveform in the middle. As the input voltage Vin further rises thereafter, the sensed value IDP of the peak current undesirably increases, although the sensed value IDP of the peak current is fixed to the value Max, due to the delay time of the peak current value detection. Thus, it appears as if the sensed value IDP of the peak current is set above the value Max. In contrast, in the case where the input peak detection circuit 28 is present, the control rates of the sample voltage Vsample and the sensed value IDP of the peak current are switched to the third control rate Rate-3 from the relationship illustrated in FIG. 10A, and the third control rate Rate-3 is held, thereby limiting the waveform value of the peak current that has the sensed value IDP to a value as low as when the peak value of the input voltage Vin is AC 120V, or lower, as indicated by the dashed waveform at the bottom.

Next, another example of the timing at which the input voltage, an input sense voltage, and the sensed value of the peak current according to the present embodiment are switched will be described, with reference to FIG. 11. FIG. 11 shows the input voltage at the top, which has, in the present embodiment, a pulsating waveform having a peak voltage of AC 100V in the first cycle and a peak voltage of AC 240V in the subsequent cycles. An input sense voltage VCL is shown in the middle of the figure, which has a waveform pulsed on and off in response to a switching frequency of the switching element 5 when the input sense voltage VCL is above the reference voltage VCLuv of a comparator 25. The sensed value IDP of the peak current is shown at the bottom. In the example, a case will be described where there are three control rates of the sample voltage Vsample and the sensed value IDP of the peak current, as in FIG. 10A.

When the input voltage is AC 100V, the peak voltage VCLpeak of the input sense voltage VCL in one cycle is lower than the reference voltage VCLp1 as shown in the middle graph. Thus, the control rates of the sample voltage Vsample and the sensed value IDP of the peak current shown in the bottom graph are the first control rate Rate-1.

When the input voltage is changed to AC 240V in a cycle of the subsequent pulsating waveform, the peak voltage VCLpeak of the input sense voltage VCL in the cycle is higher than the reference voltage VCLp2 as shown in the middle graph. Once the input peak detection circuit 28 senses that the peak voltage VCLpeak in the cycle is higher than the reference voltage VCLp2, the input peak detection circuit 28 switches the control rates of the sample voltage Vsample and the sensed value IDP of the peak current from the first control rate Rate-1 to the third control rate Rate-3 next time the sample voltage Vsample is greater than or equal to the preset first reference voltage VCLuv and the first comparator 25 grants the switching of the switching element.

Moreover, although not shown, if the input voltage further changes from AC 240V and, for example, has reduced to AC 100V, the peak voltage VCLpeak of the input sense voltage VCL in one cycle is lower than the reference voltage VCLp1. Thus, the input peak detection circuit 28 switches the control rates of the sample voltage Vsample and the sensed value IDP of the peak current from the third control rate Rate-3 to the first control rate Rate-1 next time the sample voltage Vsample is greater than or equal to the preset first reference voltage VCLuv and the first comparator 25 grants the switching of the switching element.

The light-emitting diode driving apparatus according to the present embodiment in the above configuration can linearly vary the sensed value of the peak current through the switching element 5 in response to the input voltage, and reduce an increase of the peak current, due to the delay time of the peak current value detection, by slowing the rates of changes of the sample voltage Vsample and the sensed value IDP of the peak current at high input voltages. Additionally, the light-emitting diode driving apparatus restricts the upper limit of the sensed value of the peak current, thereby preventing currents above its rating from flowing through the switching element and so on.

Moreover, the control rates of the input voltage and the sensed value of the peak current can be changed depending on an input voltage, such as AC 100V and AC 240V. Thus, the timing at which the sensed value of the peak current through the switching element 5 reaches the upper limit when a low input voltage is in use and the timing at which the sensed value of the peak current through the switching element reaches the upper limit when a high input voltage is in use can be corrected to be almost the same. Due to this, equalizing the relationship between the input voltage waveform and the input current waveform when a low input voltage is in use and when a high input voltage is in use allows power factor enhancement. Furthermore, the control rates of the sensed value of the peak current through the switching element 5 can be switched when, for example, the voltage of the AC power source has momentarily varied, thereby accommodating the variation in input voltage.

Moreover, a hysteresis value of the first input peak reference level VCLuv prevents undesirable switching of the control rates for each half input cycle in the case where the peak level of the pulsating input voltage waveform is near the first input peak reference level VCLuv.

Moreover, if the peak level of the pulsating input voltage waveform is sensed to be greater than or equal to the first input peak reference level VCLp1, the control rate of the peak current through the switching element is switched for a pulsating input voltage waveform to be applied subsequent to the sensed pulsating input voltage waveform, thereby preventing a rapid change of the peak current. Furthermore, a hysteresis value of the first input peak reference level VCLp1 prevents undesirable switching of the control rates for each half input cycle in the case where the peak level of the pulsating input voltage waveform is near the first input peak reference level VCLp1.

Moreover, since a plurality of input peak reference levels and a plurality of control rates are provided, a best suited control rate can be chosen according to the peak specification of the input voltage.

Effects similar to those obtained from the embodiment 1 can be achieved as well.

Embodiment 4

A light-emitting diode driving apparatus 52 and light-emitting diode driving semiconductor device according to an embodiment 4 will be described. The light-emitting diode driving apparatus according to the embodiment 4 of the present invention is different in configuration of a switching driver circuit 35 and a control circuit 29, as compared to the embodiment 1.

Figure 12:
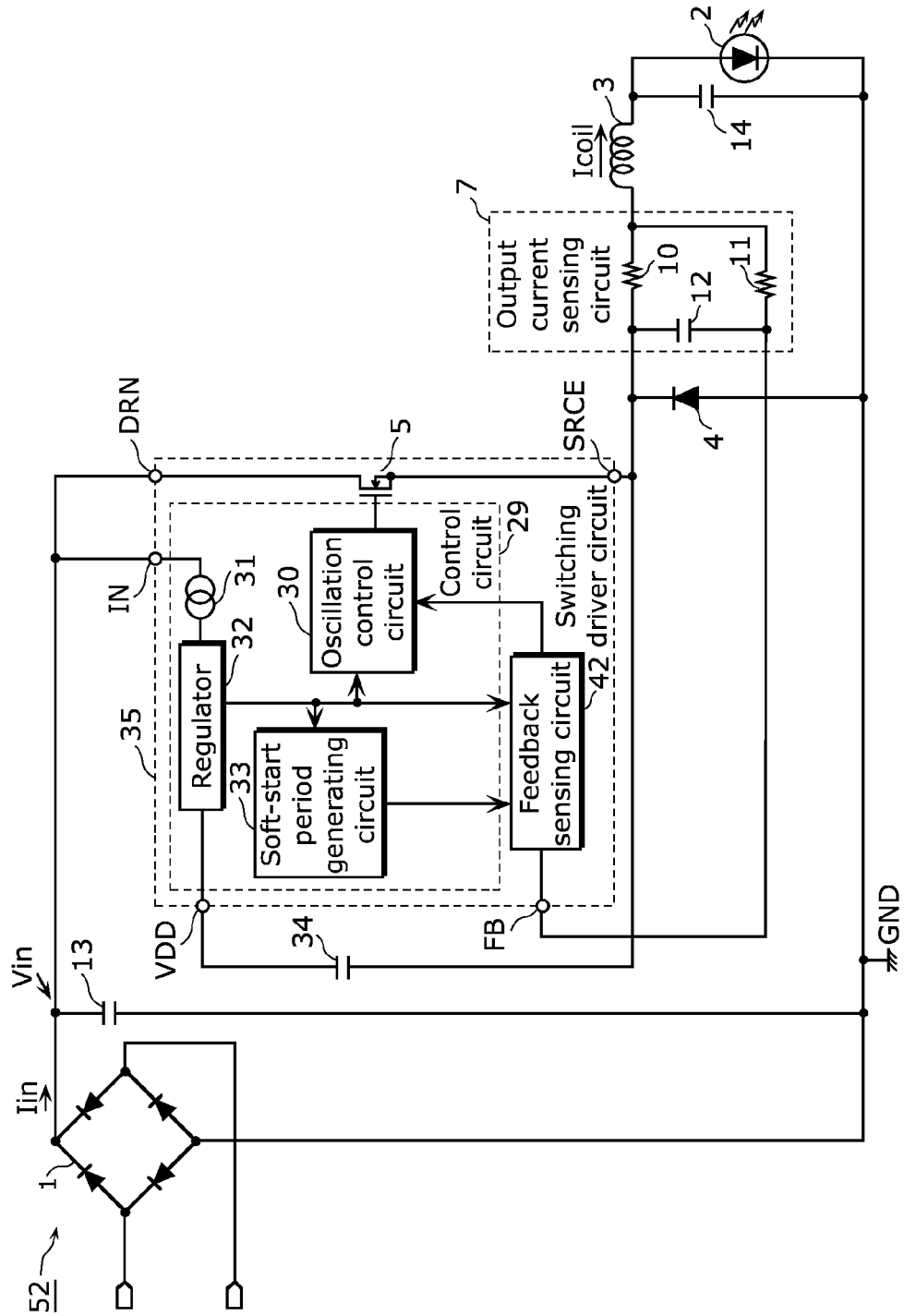
FIG. 12 is a circuit diagram showing examples of a light-emitting diode driving apparatus and a semiconductor device according to an embodiment 4.

FIG. 12 is a circuit diagram showing an example of the light-emitting diode driving apparatus 52. Compared with the switching driver circuit 9 according to the embodiment 1 in FIG. 1, the switching driver circuit 35 has two more terminals (a rectified voltage application terminal IN, a power source terminal VDD) connected externally. The rectified voltage application terminal IN is connected to the high side of a rectifying circuit 1, and an input voltage Vin having a pulsating voltage waveform is input thereto. A capacitor 34 is connected between the power source terminal VDD and a low-side terminal SRCE.

The control circuit 29 includes a constant current source 31. The constant current source 31 is connected to the rectified voltage application terminal IN on one end, generates a constant current from the input voltage Vin and outputs it to a regulator 32.

The control circuit 29 also includes the regulator 32. The regulator 32 is connected between the constant current source 31 and the power source terminal VDD, charges the capacitor 34 with the constant current from the constant current source 31 and operates in such a way that a capacitor voltage (a voltage Vdd of the power source terminal VDD) is constant. The regulator 32 also outputs an activation signal if the voltage Vdd of the power source terminal VDD is greater than or equal to a predetermined value, and outputs a deactivation signal if the voltage Vdd is less than the predetermined value. The regulator 32 also supplies a power supply voltage to the control circuit.

The control circuit 29 includes a soft-start period generating circuit 33 as well. The soft-start period generating circuit 33 determines a soft-start period TSS from when oscillation of a switching element 5 starts to when a soft start time has elapsed. It should be noted that the soft-start period generating circuit 33 may include a dedicated constant current source and a charging capacitor (not shown), and pass through a capacitor the constant current from the constant current source in response to output of the activation signal. Here, the soft-start period TSS may be from when the activation signal is output to when the capacitor voltage has reached a constant voltage. However, a circuit structure where the soft start time described above is generated is not limited thereto. Examples of a circuit structure used for measuring a constant time period are well known to those skilled in the art, and, thus, configurations therefor will not be described in detail.

The control circuit 29 includes an oscillation control circuit 30. The oscillation control circuit 30 outputs a signal that provides the control over the switching of the switching element 5, based on the activation signal and a deactivation signal from the regulator 32, and an output signal from a feedback sensing circuit 42.

Upon receipt of the activation signal from the regulator 32, the feedback sensing circuit 42 sets a feedback dummy signal (current) IFBdm to a minimum. Then, once the switching of the switching element 5 begins, the feedback sensing circuit 42 gradually increases the feedback dummy signal IFBdm in the soft-start period TSS determined by the soft-start period generating circuit 33. Then, the feedback sensing circuit 42 sets the feedback dummy signal IFBdm to a maximum after passage of the soft-start period TSS.

The light-emitting diode driving apparatus 52 according to the present embodiment in the above configurations is in soft start operation upon power-up, and the feedback dummy signal IFBdm is controlled to gradually increase from a minimum lower than an original set value. Thus, the feedback control can be provided over the feedback signal, from an output current sensing circuit 7, that has a lower value than the original set value. If the feedback dummy signal IFBdm is fixed to the original set value, the feedback control is not provided until an output current reaches an original set current, and thus the control circuit 29 provides the control over the switching of the switching element so that maximum output power is supplied. Hence, by the time the control circuit 29 provides the feedback control to reduce the output current, the output current may increase more than the set current after the output current has reached the set current. In the light-emitting diode driving apparatus according to the present embodiment, on the other hand, the feedback control can be provided even when the output current is lower than the set current. This can reduce the likelihood of an increase of the output current more than the set current upon power-up.

Effects similar to those obtained from the embodiment 1 can be achieved as well.

Embodiment 5

A light-emitting diode driving apparatus 53 and light-emitting diode driving semiconductor device according to an embodiment 5 will be described. The light-emitting diode driving apparatus according to the embodiment 5 of the present invention includes a switching driver circuit 39 and a control circuit 38 that have different configurations as compared with the embodiments 2 and 4.

Figure 13:
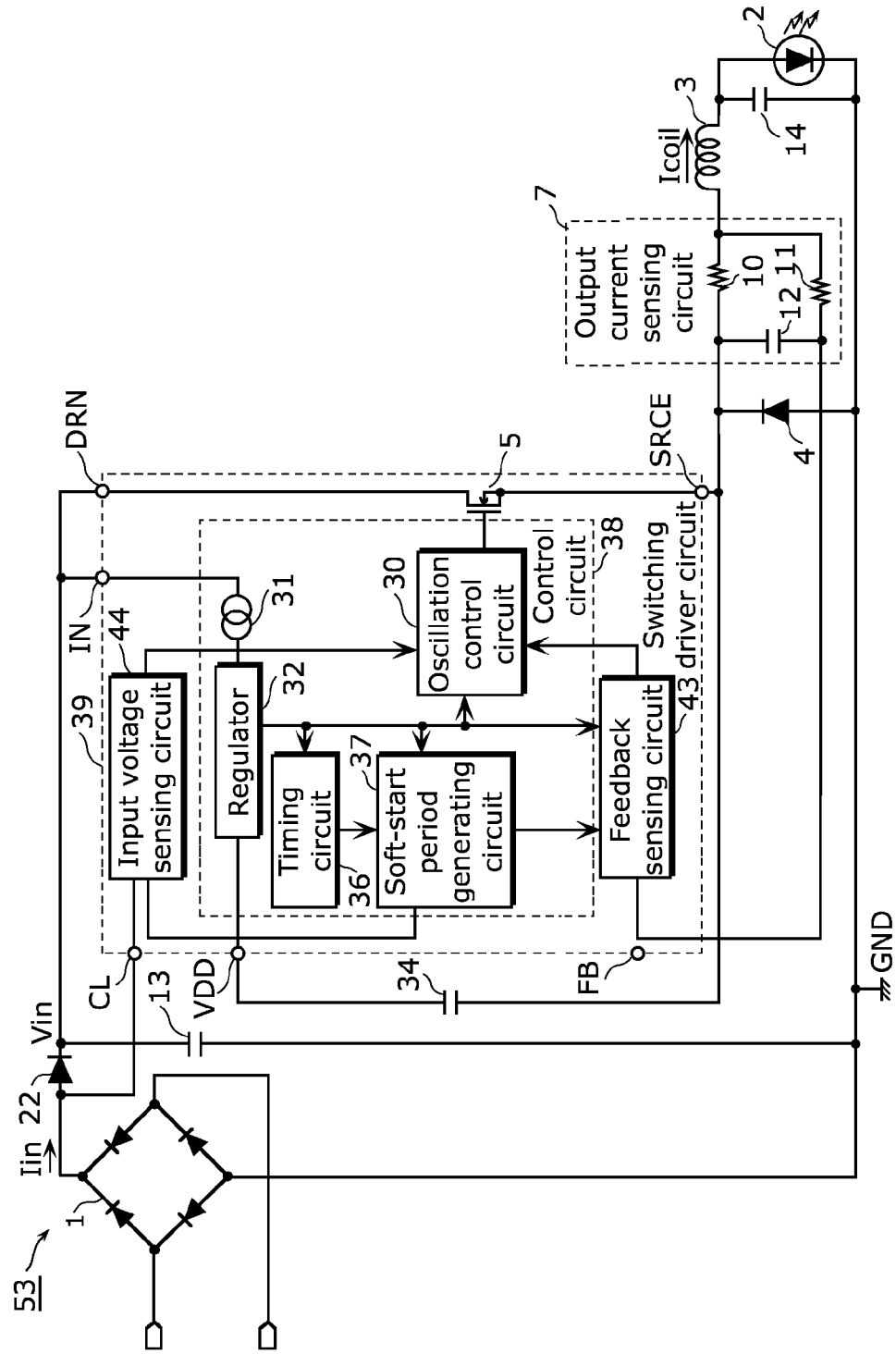
FIG. 13 is a circuit diagram showing an example of a light-emitting diode driving apparatus and a semiconductor device according to an embodiment 5.

FIG. 13 is a circuit diagram showing an example of the light-emitting diode driving apparatus 53 according to the present embodiment.

In FIG. 13, a timing circuit 36 determines a soft-start period TSS2 from when oscillation of a switching element 5 starts to when the soft start time has elapsed. As with the soft-start period generating circuit 33 described in the embodiment 4, the timing circuit 36 may include a dedicated constant current source and a charging capacitor (not shown), and pass through a capacitor the constant current from the constant current source in response to the output of an activation signal. Here, the soft-start period TSS2 may be from when the activation signal is output to when a capacitor voltage has reached a constant voltage. Preferably, the soft-start period TSS2 is a period longer than one cycle of an AC power source (50 Hz or 60 Hz).

A soft-start period generating circuit 37 is connected to a first comparator 25 of an input voltage sensing circuit 44. The soft-start period generating circuit 37 counts the number of switching grant periods PSS which is determined by an output signal of the first comparator 25 to determine a soft-start period TSS1 which is from when a regulator 32 outputs the activation signal to when the number of switching grant periods PSS reaches a preset number. Then, the soft-start period generating circuit 37 outputs and determines, as a soft-start period TSS', a shorter one of the soft-start period TSS2 determined by the timing circuit 36 and the soft-start period TSS1 determined by the number of switching grant periods PSS.

A feedback sensing circuit 43 sets the feedback dummy current IFBdm to a minimum in the soft-start period TSS' determined by the soft-start period generating circuit 37. Then, once the switching of the switching element 5 begins in the number of switching grant periods PSS determined by the output signal of the first comparator 25, the feedback sensing circuit 43 gradually increases the feedback dummy current IFBdm. The feedback sensing circuit 43 sets the feedback dummy current IFBdm to the minimum after the switching grant period PSS ends. Then, when the subsequent switching grant period PSS arrives, the feedback sensing circuit 43 gradually increases the feedback dummy current IFBdm. The above operation is repeated.

A peak current sensed value converter 45 (not shown) of the input voltage sensing circuit 44 sets a sensed value IDP of a peak current to a predetermined value smaller than a preset upper limit and holds the value during the soft-start period TSS' determined by the soft-start period generating circuit 37.

Next, operations of the components included in the light-emitting diode driving apparatus 53 according to the present embodiment in the above configuration will be described with reference to FIG. 14A.

FIG. 14A is a diagram showing waveforms when the components included in the light-emitting diode driving apparatus 53 according to the present embodiment are in operation in the case where an input voltage Vin has a full-wave rectified waveform and a peak voltage is constant.

The waveform (1) indicates the waveform of a sample voltage VCLsample. The waveform (1) is obtained by the input pulsating voltage that is input at a certain time point. A voltage range above the first reference voltage VCLuv belongs to the switching grant period PSS.

The waveform (2) is of the activation signal output from the regulator 32. In the waveform (2), the high level indicates that the switching is granted and the low level indicates that the switching is prohibited. The input pulsating voltage is input at the certain time point, the constant current is input from a constant current source 31, and when a capacitor terminal voltage Vdd on a power source terminal VDD is greater than or equal to a constant value, the regulator 32 outputs the activation signal.

The waveform (3) is a waveform during the soft-start period TSS1 which is determined by the soft-start period generating circuit 37 counting the number of switching grant periods PSS which is determined by the output signal of the first comparator 25 of the input voltage sensing circuit 44. In the waveform (3), a period at a level "H" is the soft-start period TSS1. In the example of FIG. 14A, the soft-start period TSS1 ends after two switching grant periods PSS are counted.

The waveform (4) is a waveform during the soft-start period TSS2 determined by the timing circuit 36. In the waveform (4), a period at a level "H" is the soft-start period TSS2.

The waveform (5) is a waveform during the soft-start period TSS' ultimately determined by the soft-start period generating circuit 37. Since a shorter one of the soft-start period TSS1 and the soft-start period TSS2 is applied to the soft-start period TSS', the soft-start period TSS1 is applied in the example of FIG. 14A.

The waveform (6) indicates a waveform of the feedback dummy current IFBdm. Once the switching of the switching element 5 begins in the number of switching grant periods PSS determined by the output signal of the first comparator 25, the feedback dummy current IFBdm gradually increases from a minimum. If the first switching grant period PSS ends without the feedback dummy current IFBdm reaching a maximum, the feedback dummy current IFBdm drops to the minimum, and the feedback dummy current IFBdm, again, gradually increases upon arrival of the subsequent switching grant period PSS. Then, after the second switching grant period PSS ends, the feedback dummy current IFBdm is fixed to the maximum because the soft-start period TSS' also ends.

The waveform (7) indicates a waveform of the sensed value IDP of the peak current. During the soft-start period TSS', the sensed value IDP of the peak current is fixed to a value lower than the upper limit, and after the soft-start period TSS' ends, the sensed value IDP of the peak current corresponds to the sample voltage VCLsample. An example of a current waveform which flows upon the switching of the switching element 5 is indicated by the dashed waveform.

As described above, if the input voltage Vin has a pulsating waveform, the number of switching grant periods PSS which is determined by the output signal of the first comparator 25 of the input voltage sensing circuit 44 can be counted. Thus, a shorter one of the soft-start period TSS1 and the soft-start period TSS2 is applied to the soft-start period TSS'.

FIG. 14B is a diagram showing waveforms when the components included in the light-emitting diode driving apparatus according to the embodiment 5 are in operation in the case where the input voltage Vin having been smoothed by a capacitor 13 has a constant peak voltage.

The waveform (1) indicates a waveform of the sample voltage VCLsample. The waveform (1) is obtained by the input voltage that is input at a certain time point. The input voltage Vin, although slightly drops when charged to the capacitor 13, is a substantially smoothed voltage, and thus a sample voltage Vsample after the output of the activation signal is always above the first reference voltage VCLuv.

The waveform (2) is of the activation signal output from the regulator 32. In the waveform (2), the high level indicates that the switching is granted and the low level indicates that the switching is prohibited. The input pulsating voltage is input at the certain time point, the constant current is input from a constant current source 31, and when a capacitor terminal voltage Vdd on a power source terminal VDD is greater than or equal to a constant value, the regulator 32 outputs the activation signal.

The waveform (3) is a waveform during the soft-start period TSS1 which is determined by the soft-start period generating circuit 37 counting the number of switching grant periods PSS which is determined by the output signal of the first comparator 25 of the input voltage sensing circuit 44. In the waveform (3), a period at a level "H" is the soft-start period TSS1. In the examples of FIGS. 14A and 14B, the soft-start period TSS1 ends after two switching grant periods PSS are counted. Thus, the soft-start period TSS1 after output of the activation signal is always at the level "H."

The waveform (4) is a waveform during the soft-start period TSS2 determined by the timing circuit 36. In the waveform (4), a period at a level "H" is the soft-start period TSS2.

The waveform (5) is a waveform during the soft-start period TSS' ultimately determined by the soft-start period generating circuit 37. Since a shorter one of the soft-start period TSS1 and the soft-start period TSS2 is applied to the soft-start period TSS', the soft-start period TSS2 is applied in the example of FIG. 14B.

The waveform (6) indicates a waveform of the feedback dummy current IFBdm. Once the switching of the switching element 5 begins in the switching grant period PSS determined by the output signal of the first comparator 25, the feedback dummy current IFBdm gradually increases from a minimum. In the example of FIG. 14B, the switching grant period PSS continues after the activation signal is output from the regulator 32. Thus, the gradually increased feedback dummy current IFBdm reaches a maximum at a certain point, and holds its value. For example, if the feedback dummy current IFBdm does not reach the maximum within the soft-start period TSS', the feedback dummy current IFBdm is fixed to the maximum at the end of the soft-start period TSS'.

The waveform (7) indicates a waveform of the sensed value IDP of the peak current. During the soft-start period TSS', the sensed value IDP of the peak current is fixed to a value lower than the upper limit, and after the soft-start period TSS' ends, the sensed value IDP of the peak current corresponds to the sample voltage VCLsample. An example of a current waveform which flows upon the switching of the switching element 5 is indicated by the dashed waveform.

As described above, if the input voltage Vin has a smoothed waveform, a shorter one of the soft-start period TSS1 and the soft-start period TSS2 is applied to the soft-start period TSS', despite that the number of switching grant periods PSS which is determined by the output signal of the first comparator 25 of the input voltage sensing circuit 44 cannot be counted. Thus, the soft-start period TSS' can be set.

The light-emitting diode driving apparatus 53 according to the present embodiment in the above configuration can determine the soft-start period TSS' based on a cycle of the input pulsating voltage Vin.

Moreover, since the control circuit 38 further includes the timing circuit 36, the soft-start period TSS' can be determined by either a cycle of the input pulsating voltage, or a time set by a timing circuit, if the input voltage has a pulsating waveform. Moreover, since, if the input voltage is smoothed, the soft-start period TSS' is determined by the time set by the timing circuit, the soft-start period can be determined even if the input voltage has a pulsating waveform or a smoothed waveform.

Moreover, during the soft-start period TSS', the sensed value IDP of the peak current is set to a desired value smaller than the preset upper limit and held at this value during the soft-start period TSS'. Thus, the sensed value IDP of the peak current through the switching element 5 can be fixed to a desired value smaller than the preset upper limit in the soft-start period TSS' upon power-up. In the case of a large input-output differential voltage, such as upon power-up, the slope of the current is steep, arousing a concern with respect to an increase of the peak current due to the delay time of the peak current value detection. However, the peak value (a maximum current value) of the current through the switching element 5 is limited, thereby preventing deterioration or damages to the switching element 5. Moreover, the peak current does not change in response to the input voltage, thereby reducing an increase of an output current more than a set current by the time the feedback control is provided.

Moreover, in the soft-start period TSS' upon power-up, the feedback dummy signal is gradually increased from a minimum for each cycle of the input pulsating voltage. Thus, the likelihood of an increase of the output current more than the set current can be reduced even if the output current does not reach the set current in one cycle of the input pulsating voltage.

Effects similar to those obtained from the embodiment 1 can be achieved as well.

Embodiment 6

A light-emitting diode driving apparatus 54 and a light-emitting diode driving semiconductor device according to an embodiment 6 will be described. The light-emitting diode driving apparatus according to the present embodiment is different from the embodiments 4 and 5 in that a flyback converter circuit structure is employed, rather than a buck converter circuit structure as employed in the embodiments 4 and 5. In the present embodiment, an example of the switching driver circuit 39 shown in FIG. 13, which is an example of the embodiment 5, that employs a flyback converter circuit structure will be shown. The same modification is possible also to the switching driver circuit 35 shown in FIG. 12, which is an example of the embodiment 4, that employs a flyback converter circuit structure.

Figure 15:
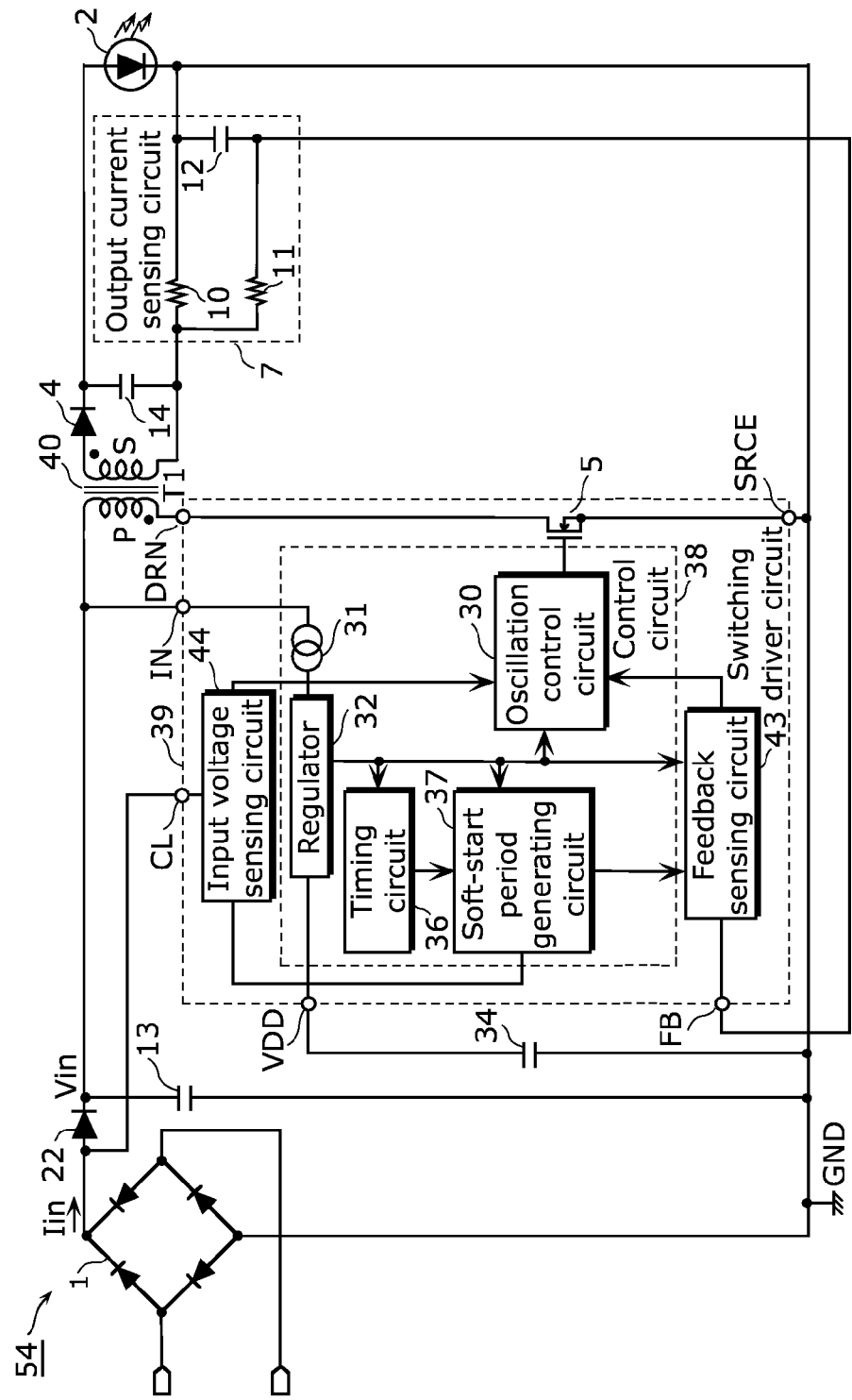
FIG. 15 is a circuit diagram showing examples of a light-emitting diode driving apparatus and a semiconductor device according to an embodiment 6.

FIG. 15 is a circuit diagram showing an example of the light-emitting diode driving apparatus 54 according to the present embodiment. In FIG. 15, a switching driver circuit 39 has the same configuration as the switching driver circuit 39 in FIG. 13. Roles of a rectifying circuit 1, capacitors 13, 14, 34, rectifier diodes 22, 4, an output current sensing circuit 7, and an LED light source 2 are the same as those of the respective components referred to by the same reference signs in FIGS. 4 and 13, and thus detailed description will be omitted.

A transformer 40, as an energy transfer element, has a primary winding P and a secondary winding S. One end of the primary winding P is connected to a cathode terminal of the rectifier diode 22, and an input power supply voltage Vin is applied thereto. The other end of the primary winding P is connected to a high-side terminal DRN of the switching driver circuit 39. A rectifier diode 4 and the capacitor 14 are connected to the secondary winding S of the transformer 40, and energy transformed by the transformer 40 is output to the LED light source 2.

A cathode terminal of the LED light source 2 is connected to the output current sensing circuit 7 and a reference potential GND of the light-emitting diode driving apparatus 54.

The output current sensing circuit 7 includes: a first resistor 10 connected to the LED light source 2, which is a load, and the low side of the secondary side of the transformer 40; a second resistor 11 connected, in parallel with the first resistor 10, to the LED light source 2, which is the load, and the low side of the secondary side of the transformer 40; and a capacitor 12 connected between the first resistor 10 and a feedback sensing terminal FB of a feedback sensing circuit 43. The output current sensing circuit 7 is connected to the cathode terminal of the LED light source 2, the secondary winding S of the transformer 40, and one end of the capacitor 14. The output current sensing circuit 7 outputs a sensed feedback signal to the feedback sensing terminal FB of the feedback sensing circuit 43.

The rectified voltage application terminal IN of the switching driver circuit 39 is connected to the cathode terminal of the rectifier diode 22, and a rectified input voltage Vin is input thereto.

An input voltage sensing terminal CL is connected to the anode terminal of the rectifier diode 22, and a rectified input voltage Vin is input thereto.

The high-side terminal DRN is connected to the transformer 40 as an energy conversion circuit. The feedback sensing terminal FB of feedback sensing circuit 43 is connected to the output current sensing circuit 7. A low-side terminal SRCE is connected to the reference potential GND of the light-emitting diode driving apparatus 54. The capacitor 34 is connected between a power source terminal VDD and the low-side terminal SRCE.

The light-emitting diode driving apparatus 54 stores energy at the transformer 40 in a period where a switching element 5 is turned on, and outputs the stored energy to the LED light source 2 via the rectifier diode 4 in a period where the switching element 5 is turned off. Here, the current through the LED light source 2 also flows through the first resistor 10 in the output current sensing circuit 7.

As a result, a control circuit 38 outputs the control signal so that a first potential difference existing across the first resistor 10 and a second potential difference existing across the second resistor 11 due to the feedback dummy current IFBdm are substantially equal. Thus, the feedback information can be transferred to the control circuit 38, without the feedback sensing circuit 43 sensing the output feedback signal which is a negative signal relative to reference potential of the control circuit 38.

The light-emitting diode driving semiconductor device for use in the light-emitting diode driving apparatus 54 according to the embodiment 6 in the above configuration is used in the light-emitting diode driving apparatus in a buck converter configuration. However, the light-emitting diode driving semiconductor device described above may also be used in the light-emitting diode driving apparatus in a flyback converter configuration.

Effects similar to those obtained from the embodiment 1 can be achieved as well.

While the light-emitting diode driving apparatus and the semiconductor device have been described with reference to the embodiments, the present invention is not limited to the embodiments described above.

For example, the light-emitting diode driving apparatus used in the light-emitting diode driving apparatus in a buck converter configuration in the above embodiment may also be used in the light-emitting diode driving apparatus in the flyback converter configuration.

In other instances, various modifications to the above-described embodiments that may be conceived by those skilled in the art and embodiments implemented by any combination of the components and functions shown in each embodiment are also included within the scope of the present invention, without departing from the spirit of the present invention.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The light-emitting diode driving apparatus and a semiconductor device according to the present invention are applicable to devices and apparatuses that use a light-emitting diode in general, and, in particular, useful for an LED bulb and LED lighting apparatuses, for example.

The invention claimed is:
1. A light-emitting diode driving apparatus comprising:
a rectifying circuit which rectifies an AC voltage input from an AC power source, to output a DC voltage;
a switching element having an input terminal connected to a high side of the rectifying circuit, which turns on and off the DC voltage;
a choke coil having one end connected to an output terminal of the switching element;
an output current sensing circuit connected between the output terminal of the switching element and the one end of the choke coil, for sensing a current through the choke coil;

an LED light source which includes one or more light-emitting diodes each having an anode terminal connected to another end of the choke coil and a cathode terminal connected to a low side of the rectifying circuit;
a rectifier diode having an anode terminal connected to the low side of the rectifying circuit and a cathode terminal connected to the output terminal of the switching element, the rectifier diode supplying the LED light source with counter electromotive force developed in the choke coil;
a control circuit which outputs a drive signal that controls on and off operation of the switching element, based on an operation reference voltage which is a voltage at a same potential as a node between the output terminal of the switching element and the cathode terminal of the rectifier diode; and
a feedback sensing circuit connected to the output current sensing circuit, for receiving an output feedback signal output from the output current sensing circuit, wherein
the feedback sensing circuit outputs a feedback dummy signal, and outputs to the control circuit a control signal that controls switching of the switching element in response to a signal based on an error between the output feedback signal and the feedback dummy signal.

2. The light-emitting diode driving apparatus according to claim 1, wherein
the output current sensing circuit includes:
a first resistor connected to the output terminal of the switching element and the one end of the choke coil;
a second resistor connected to the one end of the choke coil and a feedback sensing terminal of the feedback sensing circuit through which the feedback dummy signal is output; and
a capacitor connected between the output terminal of the switching element and the feedback sensing terminal of the feedback sensing circuit, wherein
the output feedback signal is a first potential difference existing across the first resistor due to the current through the choke coil,
the feedback dummy signal is a feedback dummy current, and
the feedback sensing circuit outputs to the control circuit the control signal so that the first potential difference and a second potential difference are substantially equal, the second potential difference existing across the second resistor due to the feedback dummy current.

3. The light-emitting diode driving apparatus according to claim 2, wherein
the feedback sensing circuit includes:
an error amplifier which compares a voltage generated between the feedback sensing terminal and an operation reference terminal of the control circuit, due to a voltage difference between the first potential difference and the second potential difference, with a reference voltage; and
a control signal converter which generates the control signal that controls the switching of the switching element, based on an output signal from the error amplifier.

4. The light-emitting diode driving apparatus according to claim 3, wherein
if the voltage generated between the feedback sensing terminal and the operation reference terminal of the control circuit due to the voltage difference between the first potential difference and the second potential difference is higher than the reference voltage of the error amplifier, the control circuit provides control to substantially increase energy output to the LED light source in response to the control signal from the control signal converter, and
if the voltage generated between the feedback sensing terminal and the operation reference terminal of the control circuit due to the voltage difference between the first potential difference and the second potential difference is lower than the reference voltage of the error amplifier, the control circuit provides control to substantially decrease the energy output to the LED light source in response to the control signal from the control signal converter.

5. The light-emitting diode driving apparatus according to claim 3, wherein
the reference voltage of the error amplifier is substantially equal to the operation reference voltage of the control circuit.

6. The light-emitting diode driving apparatus according to claim 1, wherein
the control circuit controls a switching frequency of the switching element.

7. The light-emitting diode driving apparatus according to claim 1, wherein
the control circuit controls an on-time of the switching element which operates at a certain frequency.

8. The light-emitting diode driving apparatus according to claim 1, wherein
the control circuit controls a value of a peak current through the switching element which operates at a certain frequency.

9. The light-emitting diode driving apparatus according to claim 1, wherein
the control circuit further includes:
a constant current source having one end connected to the rectifying circuit;
a regulator connected to another end of the constant current source, which outputs an activation signal if an output voltage of the constant current source is greater than or equal to a predetermined value, outputs a deactivation signal if the output voltage of the constant current source is less than the predetermined value, and supplies a power supply voltage to the control circuit; and
a soft-start period generating circuit which determines a soft-start period from when oscillation of the switching element starts to when a soft start time has elapsed,
the feedback sensing circuit sets the feedback dummy signal to a preset minimum in response to the regulator outputting the activation signal, and gradually increases the feedback dummy signal during the soft-start period in response to a start of controlling the switching of the switching element.

10. The light-emitting diode driving apparatus according to claim 9, wherein
duration of the soft-start period determined by the soft-start period generating circuit is a total duration of a preset desired number of switching grant periods which is determined by a first comparator of an input voltage sensing circuit.

11. The light-emitting diode driving apparatus according to claim 10, wherein
the control circuit further includes a timing circuit which starts counting time in response to the regulator outputting the activation signal, and
the soft-start period determined by the soft-start period generating circuit is determined by either one of the total duration of the preset desired number of switching grant periods determined by the first comparator of the input voltage sensing circuit and a preset time which is counted by the timing circuit, the preset time being longer than a cycle of the AC power source.

12. The light-emitting diode driving apparatus according to claim 11, wherein
a peak current sensed value converter sets a sensed value of a peak current to a desired value smaller than an upper limit which is preset, and holds the set sensed value of the peak current during the soft-start period.

13. The light-emitting diode driving apparatus according to claim 10, wherein
the feedback sensing circuit, during the soft-start period, repeatedly provides control of:
setting the feedback dummy signal to the preset minimum, in response to the regulator outputting the activation signal;
gradually increasing the feedback dummy signal during the preset desired number of switching grant periods determined by the first comparator of the input voltage sensing circuit; and
setting the feedback dummy signal to the preset minimum after the preset desired number of switching grant periods ends.

14. A semiconductor device for use in the light-emitting diode driving apparatus according to claim 1, the semiconductor device comprising
at least the switching element, the control circuit, and the feedback sensing circuit formed on a same semiconductor substrate or incorporated in a same package.

15. A light-emitting diode driving apparatus comprising:
a rectifying circuit which rectifies an AC voltage input from an AC power source, to output a DC voltage;
a switching element having an input terminal connected to a high side of the rectifying circuit, which turns on and off the DC voltage;
a choke coil having one end connected to an output terminal of the switching element;
an output current sensing circuit connected between the output terminal of the switching element and the one end of the choke coil, for sensing a current through the choke coil;
an LED light source which includes one or more light-emitting diodes each having an anode terminal connected to another end of the choke coil and a cathode terminal connected to a low side of the rectifying circuit;
a rectifier diode having an anode terminal connected to the low side of the rectifying circuit and a cathode terminal connected to the output terminal of the switching element, the rectifier diode supplying the LED light source with counter electromotive force developed in the choke coil;
a control circuit which outputs a drive signal that controls on and off operation of the switching element, based on an operation reference voltage which is a voltage at a same potential as a node between the output terminal of the switching element and the cathode terminal of the rectifier diode;
a feedback sensing circuit connected to the output current sensing circuit, for receiving an output feedback signal output from the output current sensing circuit; and
an input voltage sensing circuit which senses input voltage information rectified by the rectifying circuit, wherein
the feedback sensing circuit outputs a feedback dummy signal, and outputs to the control circuit a control signal that controls a switching frequency of the switching element in response to a signal based on an error between the output feedback signal and the feedback dummy signal, and
the input voltage sensing circuit outputs to the control circuit a signal that controls a sensed value of a peak current through the switching element, based on the input voltage information rectified by the rectifying circuit.

16. The light-emitting diode driving apparatus according to claim 15, wherein
the control circuit controls the sensed value of the peak current through the switching element so that an input current generated due to switching of the switching element is substantially proportional to the input voltage information rectified by the rectifying circuit.

17. The light-emitting diode driving apparatus according to claim 15, wherein
the input voltage sensing circuit includes a sample-and-hold circuit which samples the input voltage information as a sampling signal in an off-period in the on and off operation of the switching element, and holds the sampling signal during an on-period in the on and off operation of the switching element.

18. The light-emitting diode driving apparatus according to claim 15, wherein
the input voltage sensing circuit includes a sample-and-hold circuit which samples the input voltage information as a sampling signal in a preset sampling period which is after the switching element is turned off in the on and off operation, and holds the sampling signal after the preset sampling period.

19. The light-emitting diode driving apparatus according to claim 17, wherein
the input voltage sensing circuit further includes a first comparator which outputs to the control circuit a switching grant period signal which grants switching of the switching element if the sampling signal is at or above a first reference level which is preset, and prohibits the switching of the switching element if the sampling signal is below a hysteresis value of the first reference level.

20. The light-emitting diode driving apparatus according to claim 19, wherein
the input voltage sensing circuit further includes a second comparator which outputs to the control circuit a signal which holds the on-period for the switching of the switching element to a minimum if the sampling signal is below a second reference level preset higher than the first reference level.

21. The light-emitting diode driving apparatus according to claim 20, wherein
the input voltage sensing circuit further includes a peak current sensed value converter which outputs to the control circuit a signal which
changes, if the sampling signal is at or above the second reference level which is preset, the sensed value of the peak current through the switching element at a first rate in response to a level of the sampling signal,
changes, if the sensed value of the peak current is greater than or equal to a preset threshold, the sensed value of the peak current through the switching element at a second rate set slower than the first rate, and
holds the sensed value of the peak current to an upper limit which is preset, when the sensed value of the peak current reaches the upper limit.

22. The light-emitting diode driving apparatus according to claim 16, wherein
the input voltage sensing circuit further includes an input peak detection circuit which senses a peak value of a sampling signal, and
when the input peak detection circuit senses that the peak value of the sampling signal is at or above a first input peak reference level which is preset, the input peak detection circuit switches preset control rates of the input voltage information and the sensed value of the peak current through the switching element from a first control rate to a second control rate set slower than the first control rate, and outputs a signal carrying the second control rate to the control circuit.

23. The light-emitting diode driving apparatus according to claim 22, wherein
the first input peak reference level that is preset by the input peak detection circuit has a hysteresis value,
if the input peak detection circuit senses that a peak value of the input voltage information is below the hysteresis value of the first input peak reference level, the input peak detection circuit switches the preset control rates of the input voltage information and the sensed value of the peak current through the switching element to the first control rate set steeper than the second control rate, and outputs a signal carrying the first control rate to the control circuit.

24. The light-emitting diode driving apparatus according to claim 16, wherein
if the input peak detection circuit senses that a peak value of a sampling signal is at or above a first input peak reference level which is preset, the input peak detection circuit switches preset control rates of the sampling signal and the sensed value of the peak current through the switching element to a second control rate set slower than a first control rate and outputs a signal carrying the second control rate to the control circuit next time the sampling signal is at or above a first reference level which is preset and a first comparator grants the switching of the switching element.

25. The light-emitting diode driving apparatus according to claim 24, wherein
the first input peak reference level that is preset by the input peak detection circuit has a hysteresis value, and
if the input peak detection circuit senses that the peak value of the sampling signal is below the hysteresis value of the first input peak reference level, the input peak detection circuit switches the preset control rates of the sampling signal and the sensed value of the peak current through the switching element to the first control rate set steeper than the second control rate and outputs a signal carrying the first control rate to the control circuit next time the input voltage information is greater than or equal to a first reference voltage which is preset and the first comparator grants the switching of the switching element.

26. The light-emitting diode driving apparatus according to claim 22, wherein
the input peak detection circuit has two or more input peak reference levels and control rates, and switches the control rates of the sampling signal and the sensed value of the peak current through the switching element, depending on a relationship between the peak value of the sampling signal and the input peak reference levels that are preset, and outputs a signal carrying the switched one of the control rates to the control circuit.

27. A light-emitting diode driving apparatus comprising:
a rectifying circuit which rectifies an AC voltage input from an AC power source to output a DC voltage;
a load which includes an LED light source which includes one or more light-emitting diodes;
an energy conversion circuit coupled to a high side of the rectifying circuit and the load;
a switching element having an input terminal connected to a primary side of the energy conversion circuit and an output terminal connected to a low side of the rectifying circuit, the switching element turning on and off the DC voltage;
a control circuit which outputs a drive signal that controls on and off operation of the switching element, based on an operation reference voltage which is a voltage on the low side of the rectifying circuit;
an output current sensing circuit connected to the load and a low side of a secondary side of the energy conversion circuit, for sensing a current through the load; and
a feedback sensing circuit connected to the output current sensing circuit, for receiving an output feedback signal output from the output current sensing circuit, wherein
the feedback sensing circuit outputs a feedback dummy signal, and outputs to the control circuit, in response to a signal based on an error between the output feedback signal and the feedback dummy signal, a control signal that controls the switching of the switching element,
the output current sensing circuit includes:
a first resistor connected to the load and the low side of the secondary side of the energy conversion circuit;
a second resistor connected, in parallel with the first resistor, to the load and the low side of the secondary side of the energy conversion circuit; and
a capacitor connected between the first resistor and the feedback sensing terminal of the feedback sensing circuit,
the output feedback signal is a first potential difference existing across the first resistor due to a current through the secondary side of the energy conversion circuit,
the feedback dummy signal is a feedback dummy current, and
the feedback sensing circuit outputs to the control circuit the control signal so that the first potential difference and a second potential difference are substantially equal, the second potential difference existing across the second resistor due to the feedback dummy current.

28. A light-emitting diode driving apparatus comprising:
a rectifying circuit which rectifies an AC voltage input from an AC power source to output a DC voltage;
a load which includes an LED light source which includes one or more light-emitting diodes;
an energy conversion circuit coupled to a high side of the rectifying circuit and the load;
a switching element having an input terminal connected to a primary side of the energy conversion circuit and an output terminal connected to a low side of the rectifying circuit, the switching element turning on and off the DC voltage;
a control circuit which outputs a drive signal that controls on and off operation of the switching element, based on an operation reference voltage which is a voltage on the low side of the rectifying circuit; and
an output current sensing circuit connected to the load and a low side of a secondary side of the energy conversion circuit, for sensing a current through the load, a feedback sensing circuit connected to the output current sensing circuit, for receiving an output feedback signal output from the output current sensing circuit; and an input voltage sensing circuit which senses input voltage information rectified by the rectifying circuit, wherein the feedback sensing circuit outputs a feedback dummy signal, and outputs to the control circuit, in response to a signal based on an error between the output feedback signal and the feedback dummy signal, a signal that controls a switching frequency of the switching element, the input voltage sensing circuit outputs to the control circuit a signal that controls a sensed value of a peak current through the switching element, based on the input voltage information rectified by the rectifying circuit, and the control circuit controls the sensed value of the peak current through the switching element so that an input current generated due to switching of the switching element is substantially proportional to the input voltage information rectified by the rectifying circuit.

* * * * *